United States Patent [19]
Narita et al.

[11] Patent Number: 5,631,858
[45] Date of Patent: May 20, 1997

[54] SYSTEM FOR OBTAINING STRICT SOLUTION IN ACCORDANCE WITH ACCURACY OF APPROXIMATE SOLUTIONS

[75] Inventors: Masahisa Narita; Hisashi Kaziwara; Takeshi Asai; Shigeki Morinaga, all of Hitachi; Hiroyuki Kida, Kokubunji; Mitsuru Watabe, Katsuta; Tetsuaki Nakamikawa, Hitachi; Shunpei Kawasaki, Tokyo; Junichi Tatezaki, Kodaira; Norio Nakagawa, Koganei, all of Japan; Yugo Kashiwagi, Bloomington, Ind.

[73] Assignees: Hitachi, Ltd., Tokyo; Hitachi Engineering Co., Ltd., Ibaraki-ken, both of Japan

[21] Appl. No.: 89,103

[22] Filed: Aug. 12, 1993

Related U.S. Application Data

[63] Continuation of Ser. No. 536,565, filed as PCT/JP89/01134 Nov. 2, 1989, Pat. No. 5,293,558.

[30] Foreign Application Priority Data

| Nov. 4, 1988 | [JP] | Japan | 63-277242 |
| Nov. 18, 1988 | [JP] | Japan | 63-290248 |
| Dec. 9, 1988 | [JP] | Japan | 63-309968 |

[51] Int. Cl.⁶ ..................................................... G06F 7/38
[52] U.S. Cl. .............................................................. 364/732
[58] Field of Search ........................................ 364/732, 735

[56] References Cited

U.S. PATENT DOCUMENTS

| 3,590,229 | 6/1971 | Humphreys | 364/732 |
| 3,892,952 | 7/1975 | Shibata et al. | 364/732 |
| 3,928,756 | 12/1975 | Auray | 364/732 |

*Primary Examiner*—Tan V. Mai
*Attorney, Agent, or Firm*—Antonelli, Terry, Stout & Kraus, LLP

[57] ABSTRACT

A multiplication, division and square root extraction apparatus which calculates the solutions to addition, division and square root extraction functions by approximation using iteration has a multiplier, an adder-subtracter and a shifter of prescribed bit width connected to a bus. Iteration is conducted by inputting the output of the multiplier to the adder-subtracter or the shifter and returning the result to the input of the multiplier via the bus. A shifter and an arithmetic and logic unit connected to a second bus connected to the aforesaid bus via a switch have a greater bit width than the prescribed bit width and are used for large scale calculations, thus preventing a reduction in processing speed.

6 Claims, 24 Drawing Sheets

(OUTPUT FROM MULTIPLIER 10)

( ▲ INDICATES THE BINARY POINT )

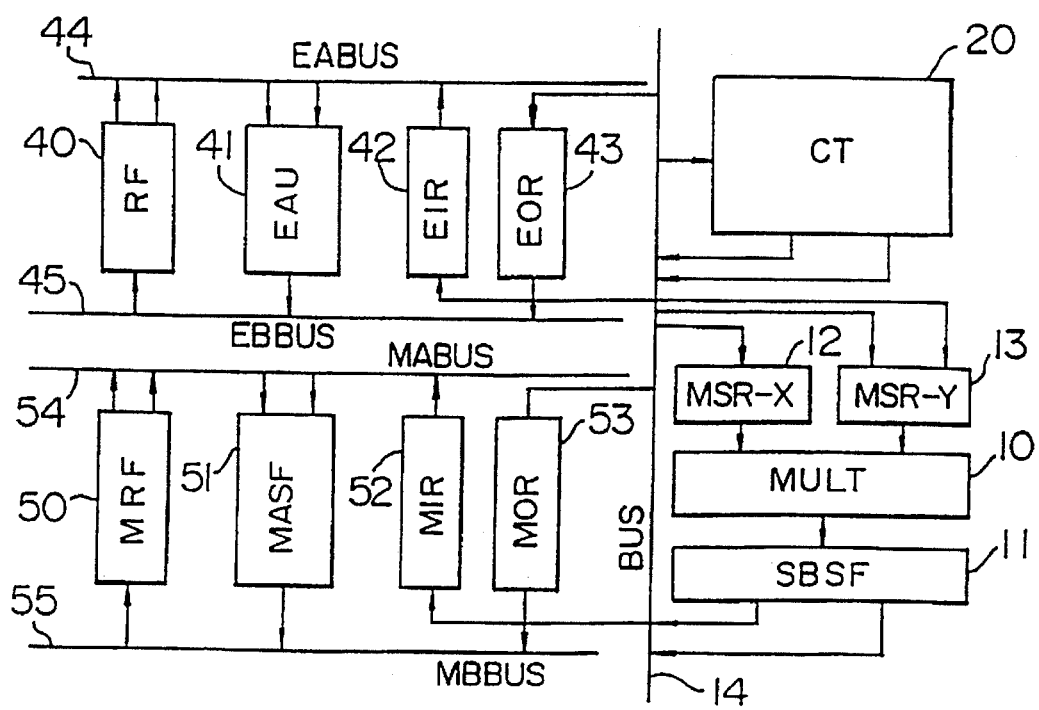
FIG. 9
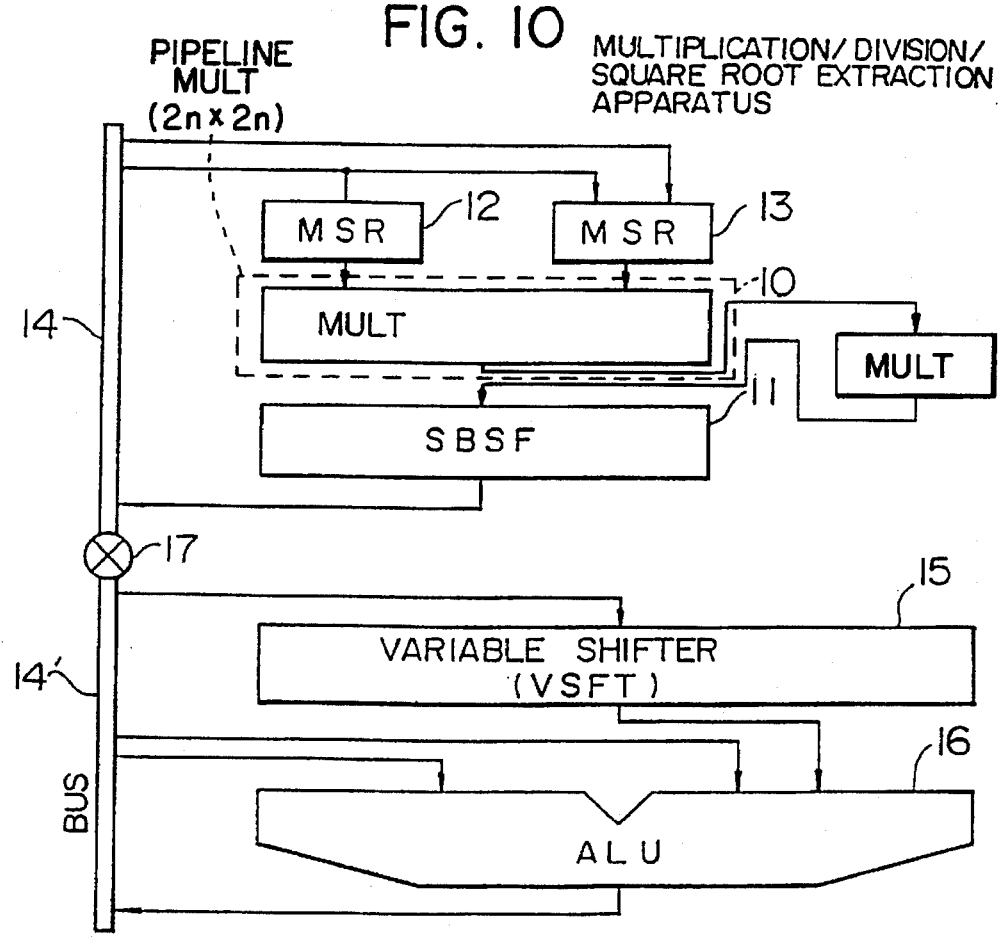
FIG. 10 MULTIPLICATION/DIVISION/SQUARE ROOT EXTRACTION APPARATUS

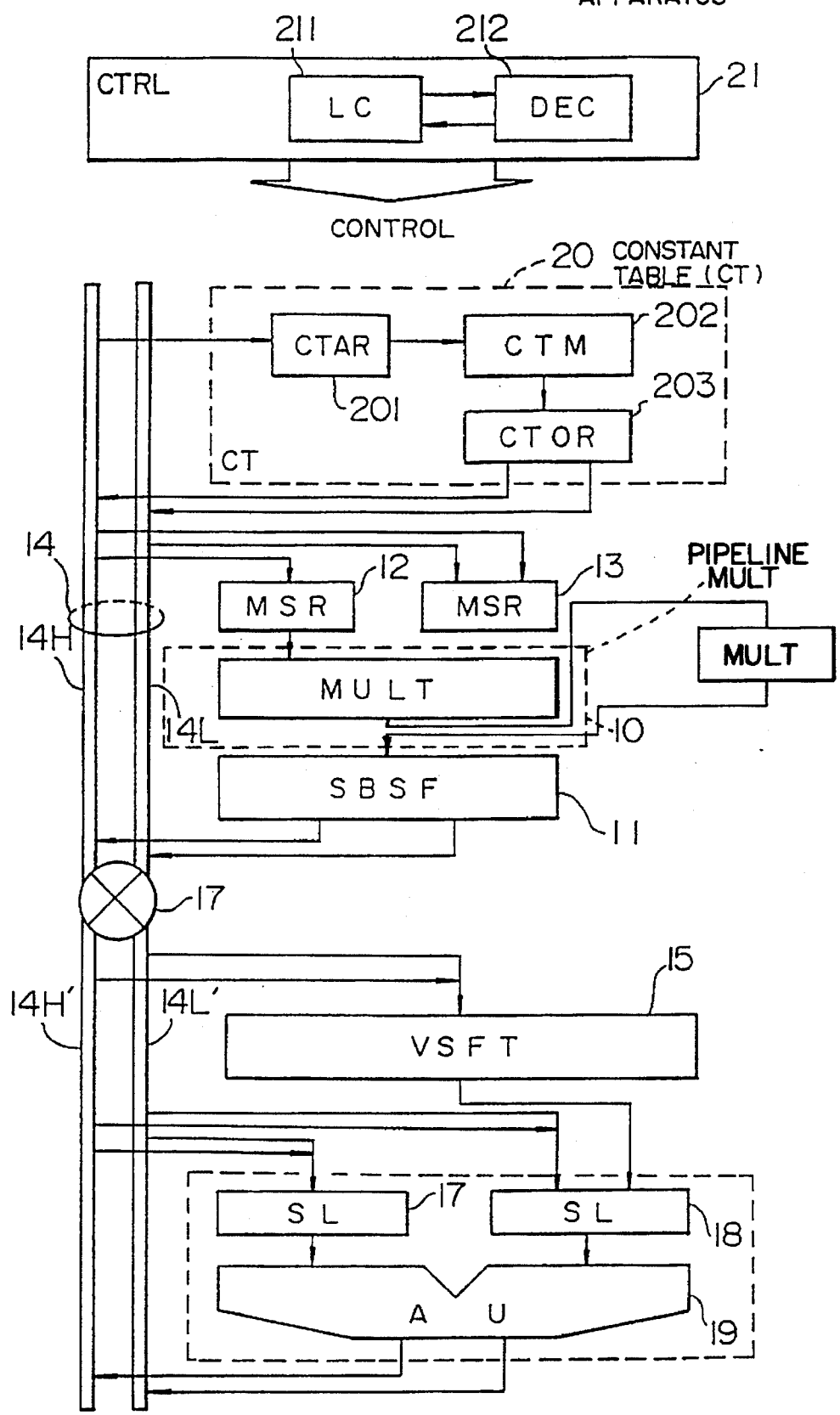
FIG. 11 — MULTIPLICATION/DIVISION/SQUARE ROOT EXTRACTION APPARATUS

2n BITS BY 2n BITS MULTIPLICATION

FIG. 16 APPROXIMATION OF 1/B

FIG. 17 — APPROXIMATION OF $1/\sqrt{A}$

FIG. 20

| DATA UPON ROUND-OFF | | | CHANGE IN VALUE OF LSB DUE TO ROUND-OFF | | | |
|---|---|---|---|---|---|---|
| SIGN BIT | LSB | GRS | RN NEAREST | RZ ZERO | RP +∞ | RM -∞ |
| 0 | 0 | 000 | − | − | − | − |
| | | 001~011 | − | − | +1 | − |
| | | 100 | − | − | +1 | − |
| | | 101~111 | +1 | − | +1 | − |
| | 1 | 000 | − | − | − | − |
| | | 001~011 | − | − | +1 | − |
| | | 100 | +1 | − | +1 | − |
| | | 101~111 | +1 | − | +1 | − |
| 1 | 0 | 000 | − | − | − | − |
| | | 001~011 | − | − | − | +1 |
| | | 100 | − | − | − | +1 |
| | | 101~111 | +1 | − | − | +1 |
| | 1 | 000 | − | − | − | − |
| | | 001~011 | − | − | − | +1 |
| | | 100 | +1 | − | − | +1 |
| | | 101~111 | +1 | − | − | +1 |

SYSTEM FOR OBTAINING STRICT SOLUTION IN ACCORDANCE WITH ACCURACY OF APPROXIMATE SOLUTIONS

This is a continuation of application Ser. No. 07/536,565, filed as PCT/JP89/01134 Nov. 2, 1989, U.S. Pat. No. 5,293,558.

TECHNICAL FIELD

This invention relates to an arithmetic apparatus having a multiplier and more particularly to a multiplication, division and square root extraction apparatus and a bus device suitable for high-speed calculation.

BACKGROUND ART

Prior art techniques for carrying out division by approximation using a multiplier are disclosed in U.S. Pat. No. 3,828,175 issued to Amdahl et al.

For increasing the multiplication speed, the arithmetic apparatus uses a multiplier in addition to an adder. Further, for increasing the speed of division and square root extraction, a method of approximation is adopted and the approximation is performed by the multiplier.

One known method of approximation is Newton-Raphson iteration. Newton-Raphson iteration is a method for solving a function using an equation for a tangent to the function. Specifically, the function f(x) is solved by solving the following recurrence formula $$x_{i+1} = x - \frac{f(x_i)}{F''(x_i)} \qquad (1)$$

$$i = 0, 1, 2, \ldots ; f'(x_i) = \frac{\partial f(x)}{\partial x}\bigg|_{x=x_i}$$

Using this method for dividing A by B, we first rewrite A÷B as $$\frac{A}{B} = A \cdot \frac{1}{B} \qquad (2)$$

and use Newton-Raphson iteration to find 1/B.

Given that f(x)=B−(1/x)=0, the recurrence formula is as follows:

$$x_{i+1} = x_i(2 - Bx_i) \qquad (3)$$

Thus, using this method, division can be conducted using only multiplication and subtraction.

In the case of square root extraction, given that $$f(x) = A - x^2 = 0 \qquad (4),$$

the recurrence formula is $$x_{i+1} = \frac{1}{2}\left(x_i + \frac{A}{x_i}\right) \qquad (5)$$

leaving a division term $A/x_i$. Then, using the relation $$\frac{1}{\sqrt{A}} \cdot A = \sqrt{A}, \qquad (6)$$

1/A is obtained by Newton-Raphson iteration.

Given that $$f(x) = \frac{1}{x^2} - A = 0, \qquad (7)$$

the recurrence formula is $$x_{i+1} = x_i \cdot \frac{1}{2} \cdot (3 - Ax_i^2) \qquad (8)$$

wherein it becomes possible to obtain the square root only by multiplication, subtraction and a ½ times-calculation. The ½ times calculation can be realized in a binary computer simply by a shift operation.

Where multiplication, division and square root extraction are conducted by the arithmetic unit, the size of the arithmetic unit required becomes larger as the scale of the calculation increases and the number of bits that have to be handled increases. On the other hand, where a small scale calculation of, say, a width of 33 bits is performed using a large scale arithmetic unit of a width of 66 bits, the time required for the small scale calculation will be the same as that needed for the large scale calculation. This means there is a tradeoff between a scale increase in the arithmetic unit for speed-up of large scale calculations accompanied by difficulty in high-speed processing for the small scale calculations and a scale increase in the arithmetic unit for speed-up of small scale calculations accompanied by difficulty in high-speed processing for the large scale calculations.

Thanks to advances in semiconductor device integration technology, it is no longer difficult to increase the scale of arithmetic units provided on a small chip. There is, however, a strong demand for speeding up the operation of the arithmetic unit and thus an urgent need to solve the aforesaid tradeoff problem.

In addition, since the realization of the high-speed processing requires the constituent devices of the arithmetic unit to operate in parallel, counter-measures are also necessary in this direction.

SUMMARY OF INVENTION

One object of the present invention is to provide an arithmetic apparatus capable of continuously conducting multiplication and subtraction processing in approximation processing by Newton-Raphson iteration.

Another object of the present invention is to provide a multiplication, division and square root extraction apparatus which, by simplification of subtraction operations through restrictions placed on subtraction processing, is capable of holding the time required for subtraction to within the unit time required for processing of multiplication.

Another object of the present invention is to provide a multiplication, division and square root extraction apparatus capable of conducting both small scale and large scale calculations at high speed, and a bus device for use therewith.

Another object of the present invention is to provide a multiplication, division and square root extraction apparatus for controlling the merging of small scale calculations and large scale calculations in a series of approximation calculations.

Another object of the present invention is to provide a floating point number arithmetic apparatus equipped with a data bus device capable of transferring processed data such that parallel execution of multiplication processing and other arithmetic processings can be ensured.

The aforesaid objects can be attained by adding a subtraction/shift circuit interposed between the output and input stages of a multiplier, applying the output of the multiplier directly to the subtraction/shift circuit, and inputting the result of operation of the subtraction/shift circuit to the multiplier through a bus or a dedicated local bus. A further increase in processing speed can be obtained by restricting the type of subtraction and simplifying the subtracter circuit. There can further be provided a control means which is coupled to an arithmetic unit for small scale calculations or a large scale arithmetic unit for large scale calculations or both and which controls the two arithmetic units such that the small scale arithmetic unit is used for calculations of the scale of n bits or less and the large scale arithmetic unit is used for calculations of the scale exceeding n bits.

It is further possible to use an arrangement in which the bus line of a bus line device has a first portion for sending and receiving data for the operation of the multiplier and a second portion which, during the operation of the multiplier, is cut off from the first portion by use of a bus switch, so that the first and second portions are used for parallel operation of the arithmetic unit.

The multiplier calculates the multiplication term in the recurrence formula while the subtraction/shift circuit subtracts from 2 or 3 the output of the multiplier, conducts a shift operation as required, and transfers the results to the multiplier through the bus. The recurrence formula is solved in this manner.

BRIEF DESCRIPTION OF DRAWINGS

FIG. 9 is a block diagram of an embodiment of the present invention applied to a floating point arithmetic apparatus;

FIG. 10 is a block diagram showing the basic arrangement of the multiplication, division and square root extraction apparatus according to another embodiment of the present invention;

FIG. 11 is a block diagram showing details of FIG. 10;

FIG. 20 is a diagram showing algorithm of round-off;

BEST MODE FOR CARRYING OUT THE INVENTION

Embodiments of the invention will now be explained with reference to the attached drawings.

Figure 1:
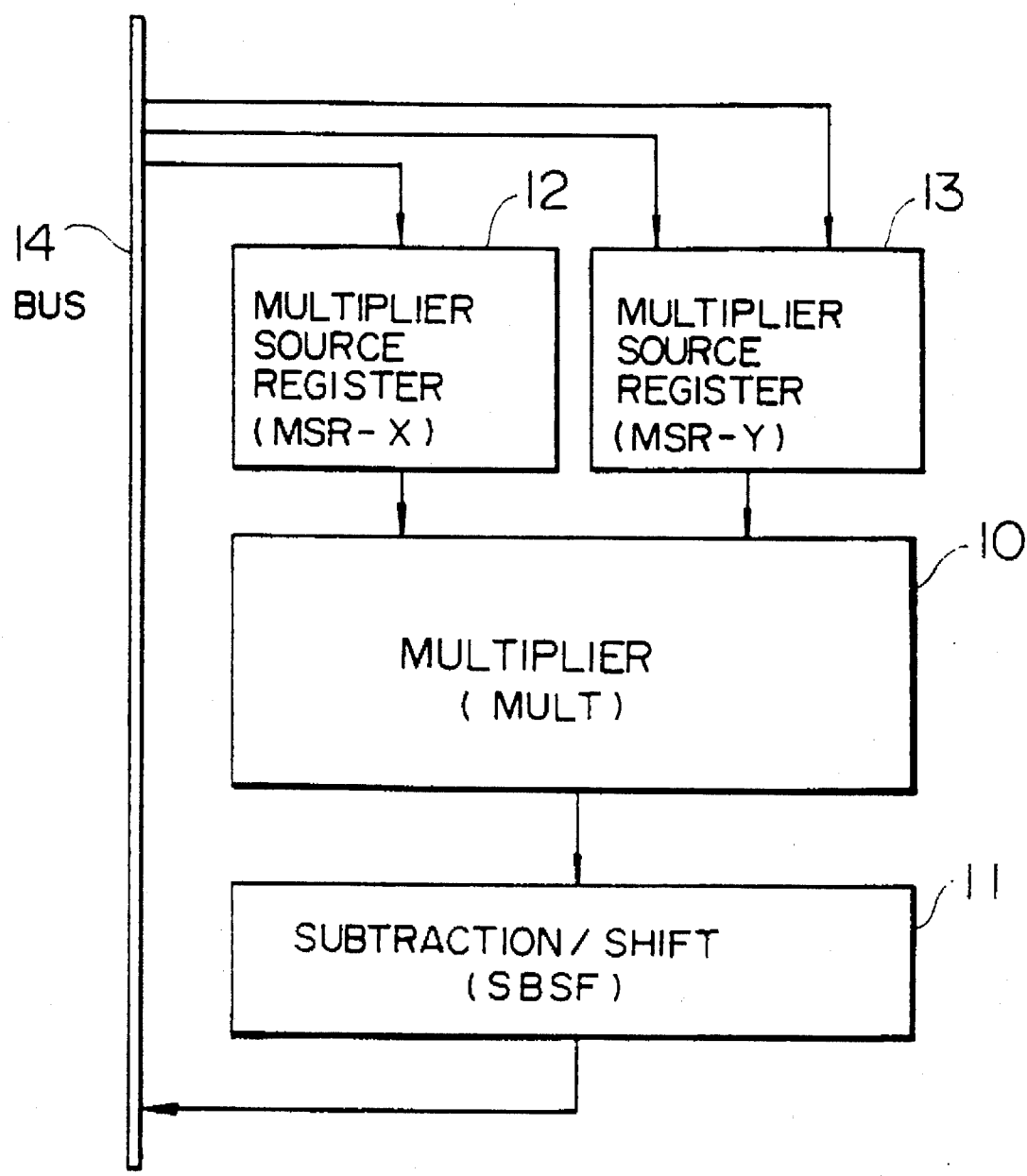
FIG. 1 is a block diagram of the basic arrangement of the present invention.

FIG. 1 shows the basic arrangement of a multiplication, division and square root extraction apparatus according to this invention. The fundamental components of the apparatus are a multiplier (MULT) 10, a subtraction/shift circuit (SBSF) 11, a multiplier source register X (MSRX) 12, a multiplier source register Y (MSRY) 13 and a bus (BUS) 14.

The multiplier or MULT 10 carries out multiplication of n bits times n bits and outputs the results of 2n bits. The SBSF 11 carries out a subtraction and shift operation, the details of which will be explained later. The MSRX 12 and MSRY 13 are n-bit registers for holding values to be inputted to the multiplier 10. The BUS 14 transfers data between the SBSF 11 and each of the multiplication source registers MSRX 12 and MSRY 13. While the data width of the BUS 14 is 2n in this embodiment, the data width is not essential to the present invention.

Figure 2:
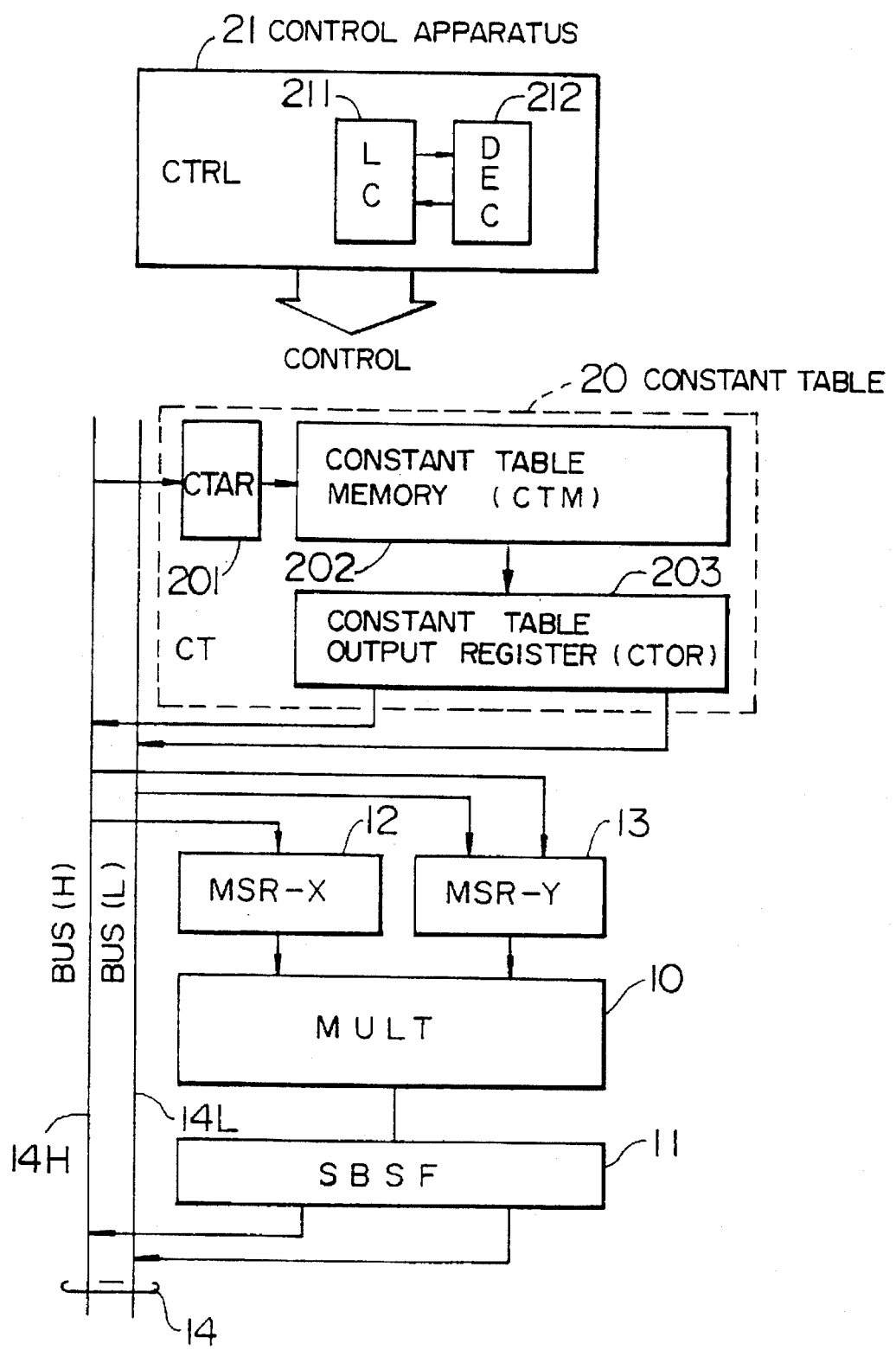
FIG. 2 is a block diagram of one embodiment of the present invention.

FIG. 2 shows the overall arrangement of the multiplication, division and square root extraction apparatus in detail. In solving a recurrence formula by Newton-Raphson iteration, an initial value is required. In this embodiment, the initial value is generated by a constant table (CT) 20. The CT 20 comprises of a constant table address register (CTAR) 201, a constant table memory (CTM) 202 and a constant table output register (CTOR) 203 and is connected to the BUS 14. The CTAR 201 receives data from the BUS 14 as an address for table reference. The contents of the CTAR 201 are used as an address for reading out a constant from the CTM 202 and forwarding it to the CTOR 203, and the contents of the CTOR 203 is outputted to the BUS 14. The data width of the BUS 14 is 2n bits, with n bits of higher order being assigned to a BUS (H) 14H and n bits of lower order being assigned to a BUS (L) 14L. In this embodiment, the input side of the CTAR 201 is connected to the BUS 14H, the output side of the CTOR 203 to the BUS (H) 14H and the BUS (L) 14L, the input side of the MSRX 12 to the BUS 14H, the input side of the MSRY 13 to the BUS 14H and the BUS 14L, and the output side of the SBSF 11 to the BUS 14H and the BUS 14L.

The operation of the multiplication, division and square root extraction apparatus is controlled by a control apparatus (CTRL) 21. The CTRL 21 includes a loop counter (LC) 211 and a decrement counter (DEC) 212 for controlling the number of approximation calculation repetitions. A prescribed value is set in the LC 211 and DEC 212 decrements this value. When the value of LC 211 becomes zero, the CTRL 21 carries out a prescribed control operation. It should be noted that it is not essential for the loop counter to be included in the control apparatus. It suffices to provide a repetition controller which functions like the loop counter somewhere within the entire apparatus including the multiplication, division and square root extraction apparatus.

Figure 3:
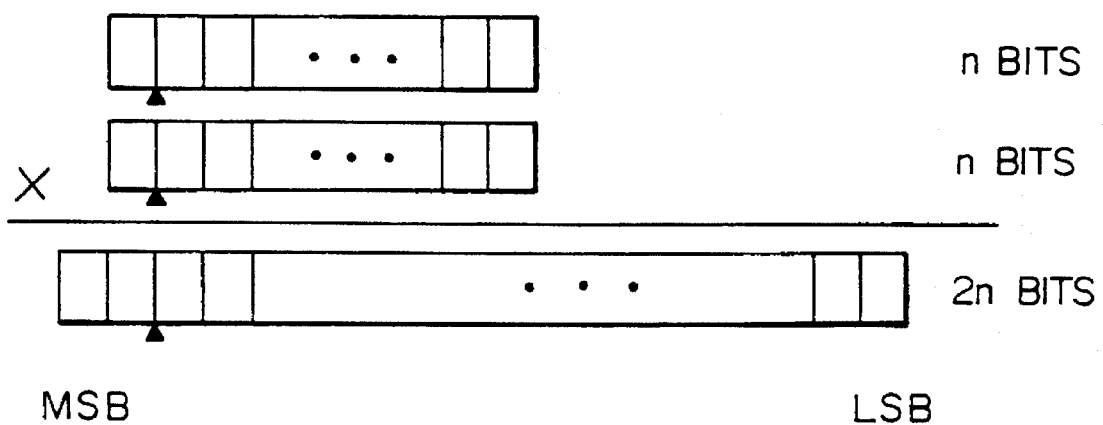
FIG. 3 is a diagram showing the operation of the multiplier.

The data handled by this embodiment is a floating point number which is represented by $S \cdot M \cdot 2^E$ (where S is the sign, M the mantissa, and E the exponent). In the present embodiment, the sign and exponent are processed outside of the multiplication, division and square root extraction apparatus and only the mantissa of the floating point number is handled in the multiplication, division and square root extraction apparatus. Further, the position of the binary point is, except for the case of the output of the multiplier, below the MSB (most significant bit). That is to say, the integer bit is one bit. As the binary point is also below the MSB in the MSRX 12 and the MSRY 13, the binary point in the output of the multiplier 10 is, as shown in FIG. 3, positioned below the MSB-1 bit. In other words, the output of the multiplier 10 has the integer bit which is of two bits length.

The function of the SBSF 11 will now be explained. The arrangement of the SBSF 11 is shown in detail in FIG. 4. It comprises a subtracter (SUB) 111, a shifter (SFT) 112, an output register (SSOR) 113 and a shift out carry register (SFC) 114. The SUB 111 carries out subtraction with respect to the output of the MULT 10, while the SFT 112 carries out a shift operation with respect to the results of the subtraction and stores the results in the SSOR 113 and SFC 114.

In the case of a division of n-bit number by a n-bit number and a square root extraction on a scale smaller than the square root of an n-bit number, the SUB 111 reduces from 2 or 3 the output of the multiplier 10. This operation is conducted as follows. Subtraction from 2 means taking a 2's complement so that if the output of the multiplier 10 is represented as $a = b_{2n-1} b_{2n-2} \blacktriangle b_{2n-3} \ldots b_1 b_0$ (where $\blacktriangle$ is the binary point), then we have $2-a = b_{2n-1} \overline{b}_{2n-2} \blacktriangle \overline{b}_{2n-3} \ldots \overline{b}_1 \overline{b}_0 + 2^{-(2n-2)}$ (where $\overline{b}_i$ is $b_i$ inverted, and $2^{-(2n-2)}$ is the carry input from the LSB). Since subtraction from 3 gives $3-a = 1+(2-a)$, it suffices to add 1 to the result of $2-a$. Since x approaches $1/\sqrt{A}$, the term $A \cdot x_i^2$ in Equation (8) becomes a number approximating 1 which is $\frac{1}{2} \cdot (3 - A \cdot x_i^2) \approx 1$. Thus, focusing attention on the fact that $b_{2n-1}$ does not become 1 (i.e. the results of the multiplication do not exceed 2), we can write $3-a = \overline{b}_{2n-2} b_{2n-2} \blacktriangle \overline{b}_{2n-3} \ldots \overline{b}_1 \overline{b}_0 + 2^{-(2n-2)}$. On the other hand, the magnitude of the carry $2^{-(2n-2)}$ is smaller than the error by the Newton-Raphson iteration approximation, so that omitting addition of $2^{-(2n-2)}$ does not affect the calculation accuracy. Therefore, it suffices if, with respect to the output result $b_{2n-1} b_{2n-2} \blacktriangle b_{2n-3} \ldots b_1 b_0$ from the multiplier 10, the SUB 111 outputs $b_{2n-1} \overline{b}_{2np31\,2} \blacktriangle \overline{b}_{2n-3} \ldots \overline{b}_1 \overline{b}_0$ for subtraction from 2 and $\overline{b}_{2n-2} b_{2n-2} \blacktriangle \overline{b}_{2n-3} \ldots \overline{b}_1 \overline{b}_0$ for subtraction from 3. When this subtraction is not carried out, the output of the SUB 111 is the same as that of the multiplier 10. Further, since, where approximation is made only to m bits (2n>m), delivery of any value related to the lower 2n+m-2 bits is meaningless, the operation of the SUB 111 may be limited to the upper 2n-m+2 bits only.

As the output of the SUB 111 has its binary point below the (MSB-1) bit, for use of this value in further calculation it is necessary to move the binary point to below the MSB. For this purpose, the SFT 112 shifts the output of the SUB 111 one bit to the left while filling zero in the bit position which becomes empty by the shift. The result is outputted to the SSOR 113. At that time, one bit of the MSB of the output of the SUB 111 is sent to the SFC 114 as a shift out carry.

Thus, the binary point is matched. As the term $2-B \cdot x_i$ in Equation (3) is close to 1, the SFC 114 does not assume the value 1. In the case of square root extraction, the operation of multiplying by $\frac{1}{2}$ in the recurrence formula is performed by applying the output of the SUB 111 directly to the SSOR 113 without shifting. This will cause the binary point to shift apparently one bit to the left, completing the same operation as multiplying by $\frac{1}{2}$. In this embodiment, since the position of the binary point on the bus is shifted one bit to the left with respect to the multiplier output, there is no need to carry out a shift operation in the case of a square root extraction. However, where the binary point position relationship is different from that in this embodiment, it will become necessary in the case of square root extraction to shift the binary point by one bit to the left.

The method in which division and square root extraction are conducted using this embodiment will now be explained.

Figure 5:
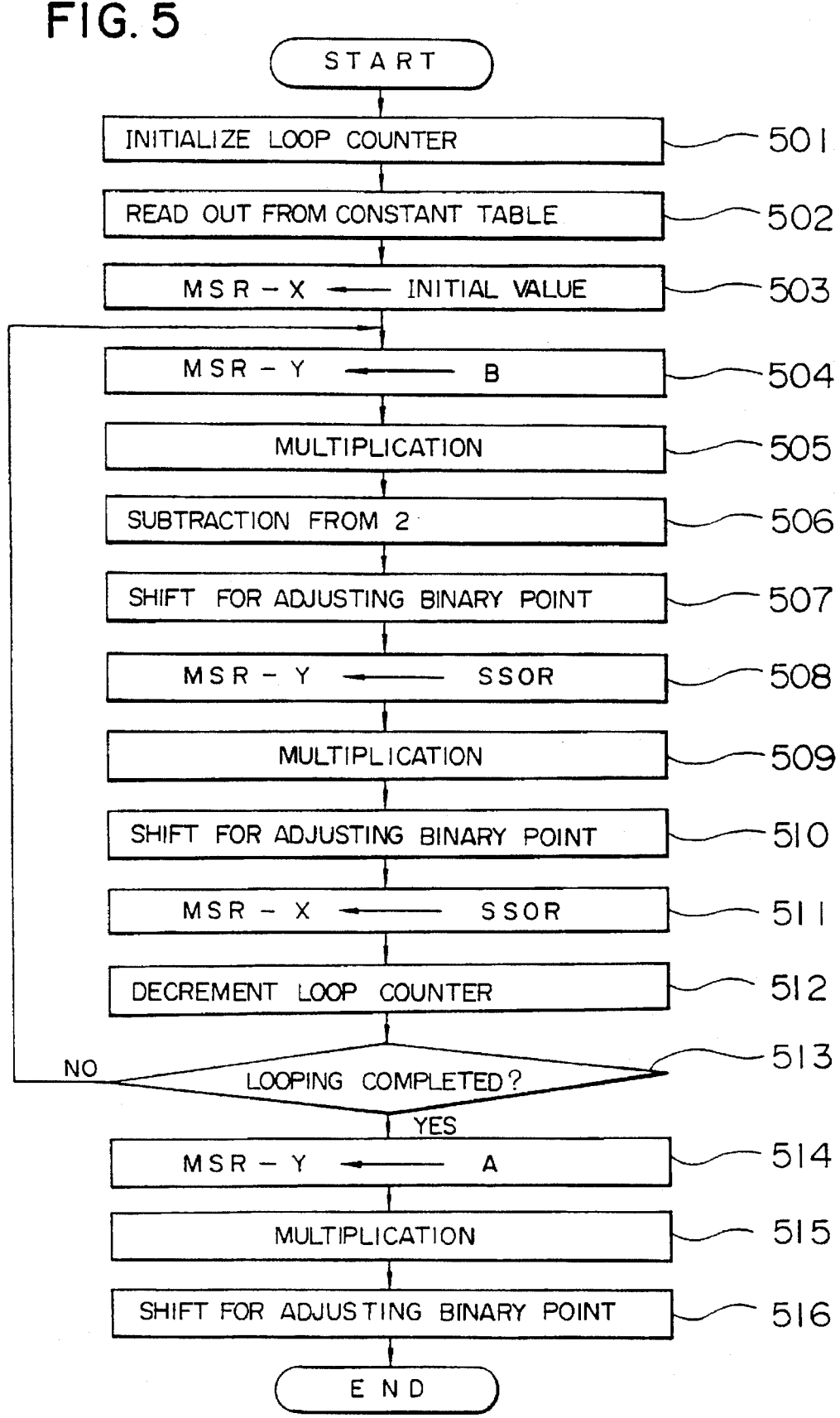
FIG. 5 is a subtraction flowchart.

Reference is made first to the flowchart of FIG. 5, which relates to division. In the routine shown in FIG. 5, the division operation $A \div B$ is carried out by first obtaining $1/B$ in accordance with the recurrence formula (3) and thereafter obtaining $(1/B) \cdot A$. The procedure will be explained with reference to the figure.

First the number of repetitions of the calculation according to the recurrence formula is set in the LC 211 of the CTRL 21. The number of repetitions is predetermined depending on the accuracy of the initial value and the precision of the value to be obtained (501). Next, the initial value for the calculation according to the recurrence formula is read from the CT 20. The divisor B is placed on the BUS 14. When the data on BUS (H) 14H is $b_{2n-1} b_{2n-2} \ldots b_{n+1} b_n$, the $(m-1)$-bit data $b_{2n-2} b_{2n-3} \ldots b_{2n-m}$ is entered into the CTAR 201. This is because this multiplication, division and square root extraction apparatus handles floating point number mantissa data so that the integer bit, i.e., $b_{2n-1}$ on the BUS 14H, is always 1. An initial value of the 1-bit corresponding to the contents of the CTAR 201 is read from the CTM 202. The output of the CTM 202 is set in the CTOR 203. While the data width of the CTOR 203 is 2n bits, it may be narrower. The output data width 1 of the CTM 202 is made m-1 or more. However, in the case of division, the range of values from which the initial value can be selected is $\frac{1}{2} < x \leq 1$. The decimal number 1 is represented in binary notation as $1 \approx 0.111 \ldots$. Therefore, in the initial value, the integer bit and the first bit below the binary point are 0 and 1, respectively. The data width l of the CTM 202 may be set at or lower than the second position below the binary point. The CTM 202 has a logic circuit which, at the time of storing the initial division value in the CTOR 203, enters 0 or 1 into the integer bit and the first bit below the binary point. Alternatively, it is possible to increase the accuracy of the initial value without changing the data width l. A predetermined fixed value is entered into the lower 2n—2 bits of the CTOR 203 (502). The initial value read from the CTOR 203 is inputted to the MSRX 12 via the BUS 14 (503). The MSRY 13 receives the divisor B (504). The values in MSRX 12 and MSRY 13 are multiplied. As a result, the term $B \cdot x_i$ in Equation (2) is calculated (505). Next, the SUB 111 subtracts the result of the multiplication from 2 so that term $2-B \cdot x_i$ of Equation (2) is calculated (506). The SFT 112 shifts the result of the subtraction one bit to the left while filling in a zero, and sets the shifted result in the SFC 114 and SSOR 113. Thus, the position of the binary point is matched (507). The upper n bits of the contents of the SSOR 113 are forwarded to the MSRY 13 through the BUS (H) 14H (508). The contents of the MSRX 12 and the contents of the MSRY 13 are multiplied. As the MSRX 12 holds the value of $x_i$ in the Equation (2), calculation of the right side of the Equation 2, $x_i \cdot (2 - B \cdot x_i)$, is completed (509). The SUB 111 carries out no operation on the results of the multiplication, but the SFT 112 performs a left shift for matching the position of the binary point (510). The upper n bits of the SSOR 113 are forwarded to the MSRX 12 through the SUS (H) 14H. As a result, substitution of the right side into the left side of the recurrence formula is completed (511). The content of the LC 211 is decremented by the DEC 212 and the resulting value is inputted to the LC 211 (512). If the contents of the LC 211 satisfies the condition for termination of the calculation, the CTRL 21 causes the procedure to advance to step (514). Otherwise, it returns the procedure to step (504) (513). The value of the divided A is inputted to the MSRY 13 (514). The contents of the MSRX 12 and the contents of the MSRY 13 are multiplied. As a result, 1/B obtained by the approximation and A are multiplied, completing the division A÷B (515). The SFT 112 shifts the result of the multiplication to the left and inputs the shifted result to the SFC 114 and SSOR 113. As a consequence, the final result of the division according to the present embodiment is stored in the SSOR 113 (516).

Figure 6:
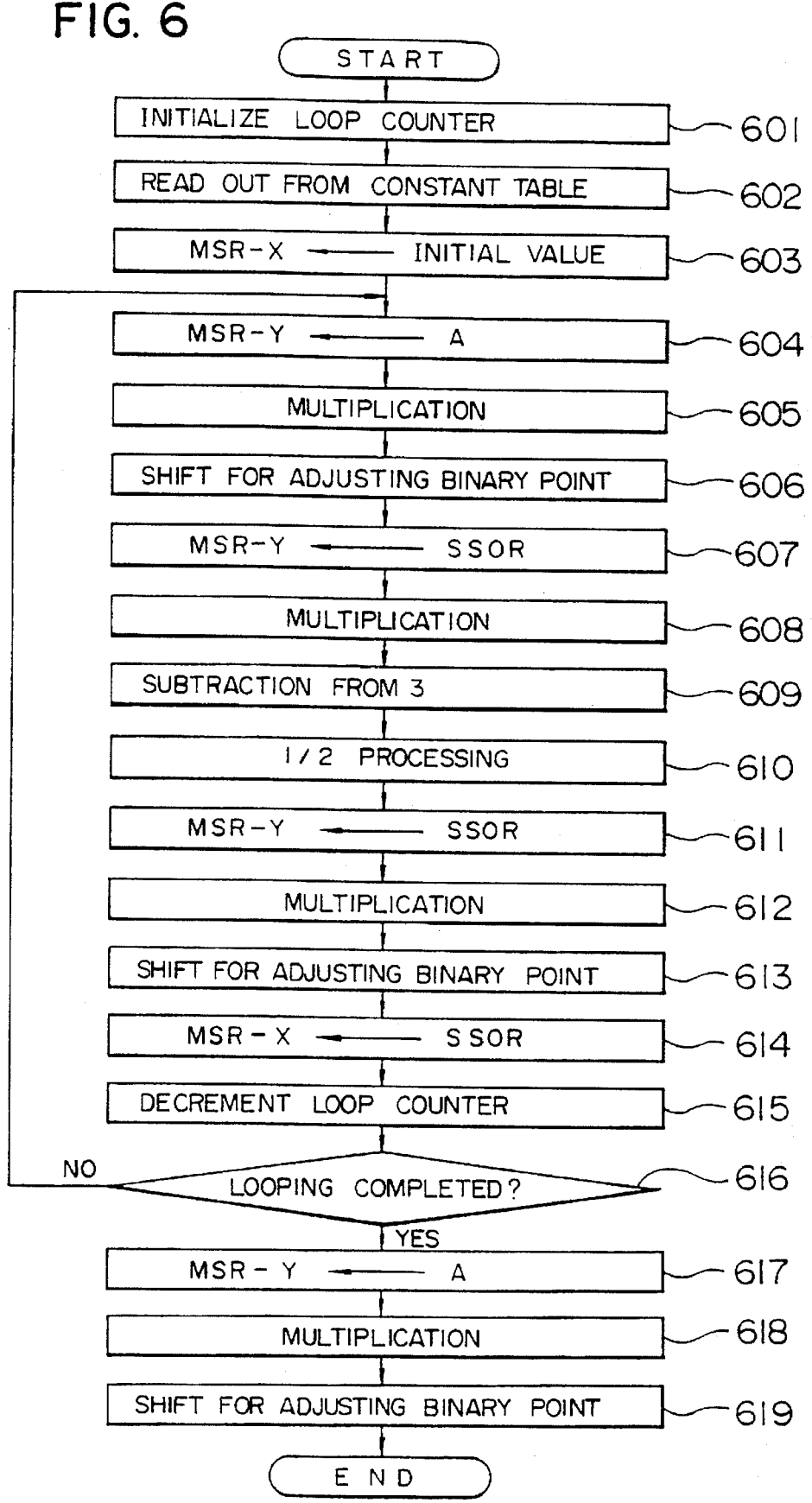
FIG. 6 is a square root extraction flowchart.

Square root extraction will now be explained with reference to the flowchart of FIG. 6. In the routine shown in FIG. 6, $\sqrt{A}$ is calculated by first obtaining $1/\sqrt{A}$ in accordance with the recurrence formula (4) and then multiplying the result by A. The procedure will be explained with reference to the figure.

First the number of repetitions of the calculation according to the recurrence formula is set in the LC 211 of the CTRL 21. As in the case of division, the number of repetitions is predetermined in advance (601). Next, the initial value for the calculation according to the recurrence formula is read from the CT 20. The procedure is basically the same as that used in division. In square root extraction, however, if the exponent is an odd number, and then if the method is employed wherein the calculation is conducted after the mantissa has been modified to an even number by division by 2, the integer bit of the mantissa will not necessarily be 1. Thus, while the value of the number A whose root is to be obtained is placed on the BUS 14, the (m-1)-bit data $b_{2n-1} b_{2n-2} \ldots b_{2n-(m+1)}$ is entered into the CTAR 201 given that the data on BUS (H) 14H is $b_{2n-1} b_{2n-2} \ldots b_{n+1} b_n$. The contents of the CTAR 201 are used as an address for reading out an l-bit initial value from the CTM 202. The output of the CTM 202 is set in the CTOR 203, but since in square root extraction the range from which initial values can be selected is $1/\sqrt{2} < x \leq \sqrt{2}$, the integer bit of the initial value is not necessarily 1. Therefore, as opposed to the case of division, the integer bit cannot be set in advance (602). The initial value read from the CTOR 203 is forwarded to the MSRY 12 though the BUS 14 (603). The number A whose root is to be found is inputted to the MSRY 13 (604). The contents of MSRX 12 and the contents of MSRY 13 are multiplied. Thus, the term $A \cdot x_i$ of Equation (4) is calculated (605). The SFT 112 carries out a 1-bit left shift with respect to the result of the multiplication for matching the position of the binary point. The result is inputted to the SFC 114 and the SSOR 113 (606). The upper n bits of the contents of the SSOR 113 are forwarded to the MSRY 13 through the BUS (H) 14H (607). The contents of the MSRX 12 and the contents of the MSRY 13 are multiplied. As the MSRX 12 holds the value of $x_i$ in the Equation (4), the $A \cdot x_i^2$ term of the Equation (4) is obtained (608). Next, the SUB 111 subtracts the result of the multiplication from 3. Thus, the term $3 - A \cdot x_i^2$ of Equation (4) is calculated (609). The SFT 112 inputs the result of the subtraction to SSOR 113 without shifting. As a consequence, the result of the subtraction is relatively shifted one bit to the right, whereby the term $\frac{1}{2} \cdot (3 - A \cdot x_i^2)$ in the Equation (4) is calculated (610). The upper n bits of SSOR 113 are forwarded to the MSRY 13 through the BUS (H) 14H (611). The contents of MSRX 12 and the contents of MSRY 13 are multiplied. As the MSRX 12 holds the value of $x_i$ in the Equation (4), the $x_i \cdot \frac{1}{2} \cdot (3 - A \cdot x_i^2)$ term on the right side of the Equation (4) is obtained (612). The SFT 112 carries out a left shift with respect to the result of the multiplication for matching the position of the binary point (613). The upper n bits of SSOR 113 are forwarded to the MSRX 12 through the BUS (H) 14H. As a result, a substitution of the right side into the left side of the recurrence formula is carried out (614). The content of the LC 211 is decremented by the DEC 212 and the resulting value is inputted to the LC 211 (615). If the contents of the LC 211 satisfies the condition for termination of the calculation, the CTRL 21 causes the procedure to advance to step (617). Otherwise, it returns the procedure to step (604) in step (616). The value of the number A whose root is to be found is inputted to the MSRY 13 (617). The contents of the MSRX 12 and the contents of the MSRY 13 are multiplied. As a result, $1/\sqrt{A}$ obtained by the approximation and A are multiplied, completing the calculation of $\sqrt{A}$ (618). The SFT 112 shifts the result of the multiplication to the left and inputs the shifted result to the SFC 114 and SSOR 113. As a consequence, the final result of the square root extraction according to the present embodiment is stored in the SSOR 113 (619).

From the foregoing detailed explanation, it can be understood that the present embodiment performs division and square root extraction.

Other embodiments will now be explained with reference to FIGS. 7 and 8.

Figure 7:
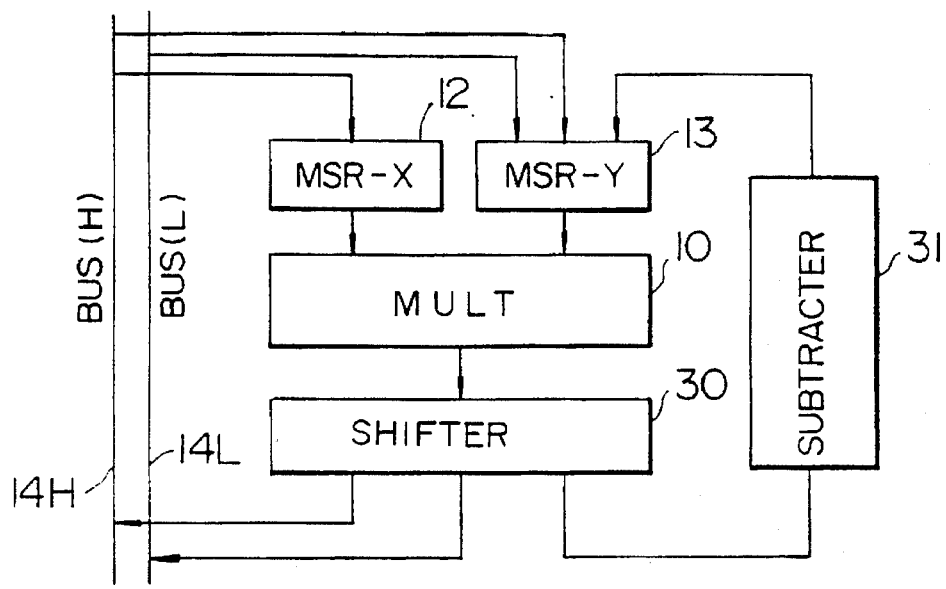
FIGS. 7 and 8 are block diagrams showing basic arrangements of other embodiments of the present invention.
Figure 8:
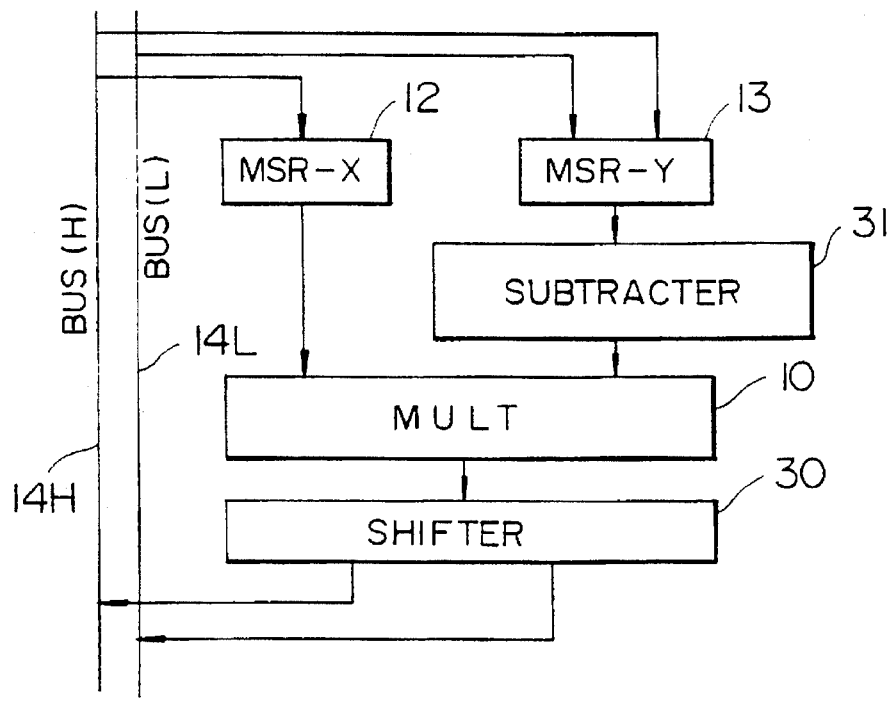

In the embodiments shown in FIGS. 7 and 8, the subtraction/shift circuit of the preceding embodiment is divided into a subtracter and a shifter. The shifter 30 in FIGS. 7 and 8 is constructed similarly to the SFT 112, SSOR 113 and SFC 114 in the preceding embodiment. The subtracter 31 in FIGS. 7 and 8 is constituted in the same manner as the SUB 111 in the preceding embodiment. In the present embodiment, however, the data width is n bits. Further, since a shift is carried out beforehand, the subtraction from 2 is done by inverting all bits from $b_{2n-1}$ to $b_n$. In the embodiment of FIG. 7, the subtracter 31 is located between the output of the shifter 30 and the input of the MSRY 13. In the embodiment of FIG. 8, it is located between the output of the MSRY 13 and the input of the multiplier 10.

Division and square root extraction in the embodiments of FIG. 7 and 8 are carried out in the same manner as in the preceding embodiment.

Next, there will be explained an embodiment of a floating point processor using a multiplication, division and square root extraction apparatus according to the invention. The basic arrangement of this embodiment is shown in FIG. 9.

The main components of the floating point processor are an exponent processor, a mantissa processor, a multiplication, division and square root extraction apparatus, and a control unit. The fundamental components of the exponent processor are an exponent register file (ERF) 40, an exponent arithmetic unit (EAU) 41, an exponent input register (EIR) 42, an exponent output register (EOR) 43, an exponent A bus (EABUS) 44 and an exponent B bus (EBBUS) 45. The fundamental components of the mantissa processor are a mantissa register file (MRF) 50, a mantissa arithmetic shifter (MASF) 51, a mantissa input register (MIR) 52, a mantissa output register (MOR) 53, a mantissa A bus (MABUS) 54 and a mantissa B bus (MBBUS) 55. The ERF 40 stores the exponent data. The EAU 41 processes the exponent part in floating point processing. The EIR 42 receives data from the BUS 14. The EOR 43 sends data to the BUS 14. The EABUS 44 and the EBBUS 45 are buses for transferring data among the ERF 40, EAU 41, EIR 42 and EOR 43. The MRF 50 stores mantissa data. The MASF 51 processes the mantissa and performs a shift operation in floating point processing. The MIR 52 receives data from the BUS 14. The MOR 53 sends data to the BUS 14. The MABUS 54 and the MBBUS 55 are buses for transferring data among the MRF 50, MASF 51, MIR 52 and MOR 53. In this embodiment, the BUS 14 handles the transfer of data among the exponent processor, the mantissa processor and the multiplication, division and square root extraction apparatus. As the exponent processor, mantissa processor and multiplication, division and square root extraction apparatus in this embodiment operate independently of each other, the floating point processing can be carried out at high speed.

FIG. 10 is a block diagram showing the basic arrangement of the multiplication, division and square root extraction apparatus according to another embodiment of the invention. As in the first embodiment shown in FIG. 1, a multiplier 10, having plural multipliers that execute a plurality of multiplication processings in pipeline fashion, multiplies the contents of an n-bit multiplier source register (MSR) 12 and the contents of an n-bit multiplier source register (MSR) 13 and outputs the result to a subtraction/shift circuit (SBSF) 11. Since the multiplier 10 does multiplication in pipeline fashion to increase the processing speed proportionally, depending on whether the calculation being done is division or square root extraction, the subtraction/shift circuit 11 subtracts the output value of the multiplier 10 from either 2 or 3, then matches the binary point and delivers the results to the 2n-bit BUS 14. A variable shifter (VSFT) 15 shifts data received from the BUS 14 a desired number of bits to the left or right, rounds off the data swept off to the right, and outputs the results to an arithmetic and logic unit (ALU) 16. The ALU 16 carries out 2n-bit arithmetic and/or logic operations on data taken in from the BUS 14 or data outputted by the variable shifter 15 and outputs the results to the BUS 14. The ALU 16 and the shifter 15 are coupled to a BUS 14' which is coupled to the BUS 14 through a switch 217.

The multiplication, division and square root extraction apparatus explained with reference to FIG. 10 is shown in detail in FIG. 11. In addition to the components explained earlier in connection with the arrangement shown in the block diagram of FIG. 2, the arrangement of FIG. 11 also has a variable shifter 15 connected at its input side to the BUS 14H' and the BUS 14L' and the ALU 16 connected at both its input and output sides to these same buses.

The ALU 16 comprises a 2n-bit source latch 17 with 1-bit left and right shift capability and inversion capability, a source latch 18 which in addition to the aforesaid capabilities has a two-way multiplexing function to select one or the other of two inputs (the input from the BUS 14H' and the BUS 14L' and the input from the VSFT 15), and an adder 19 for adding the inputs from the two source latches 17 and 18.

Figure 12:
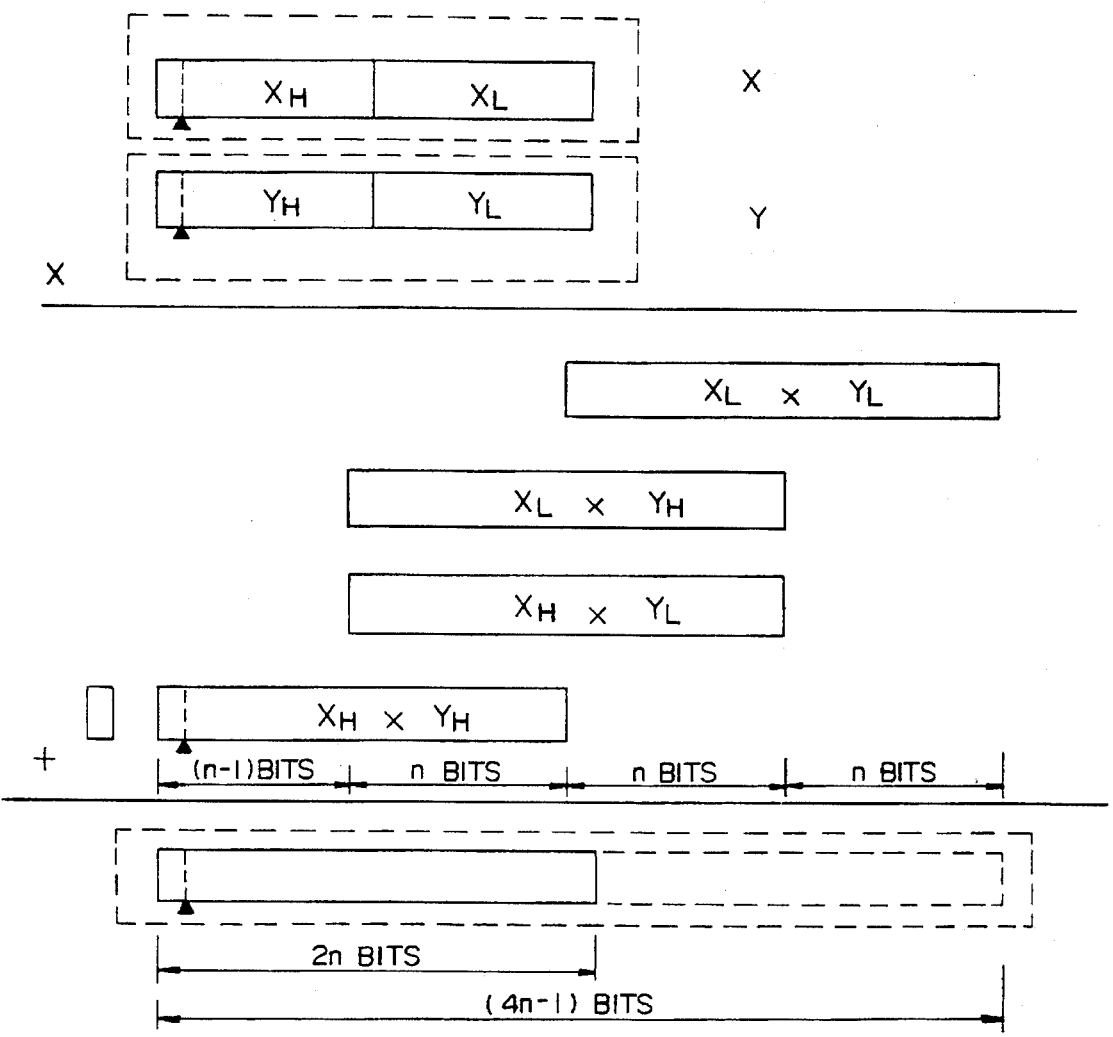
FIG. 12 is a diagram for explaining (2n bits)×(2n bits) multiplication.

The control apparatus (CTRL) 21 for controlling the operation of the multiplication, division and square root extraction apparatus includes a loop counter (LC) 211 and a decrement counter (DEC) 212 for controlling the number of approximation calculation repetitions. A prescribed value is set in the LC 211 and DEC 212 decrements this value. When the value of LC 211 becomes zero, the CTRL 21 carries out a prescribed control operation. It should be noted that it is not essential for a loop counter 211 to be included in the control apparatus 21. It suffices to have a repetition controlling means which provides the same function as the loop counter somewhere within the entire apparatus including the multiplication, division and square root extraction apparatus. As in the case of the preceding first embodiment, the present embodiment also handles only the mantissa M of floating point number. The function of the BSFT 15 provided in addition to the constituents of the first embodiment will now be explained. For conducting approximation in excess of n bits, it is necessary to conduct multiplication of the same scale. Explanation will now be given concerning 2n-bit by 2n-bit multiplication, 2n-bit by 2n-bit division and 2n-bit square root extraction in the present embodiment. The 2n-bit by 2n-bit multiplication is carried out as shown in FIG. 12. In multiplying a 2n-bit multiplicand X by a 2n-bit multiplier Y, X is divided into the upper n-bits $X_H$ and the lower n-bits $X_L$ and Y is divided into the upper n-bits $Y_H$ and the lower n-bits $Y_L$. Then the partial products $X_H \times Y_H$, $X_H \times Y_L$, $X_L \times Y_H$, $X_L \times Y_L$ are obtained and added together for digit matching to obtain the result of the multiplication X×Y. When the partial products $X_L \times Y_L$ and $X_L \times Y_H$ are added, it is necessary to match the digit by shifting the value of $X_L \times Y_L$ outputted by the MULT 10 to the right while filling zero in empty bit portions. In the present embodiment, in consideration of the fact that the data handled is floating point data, data which is 2n bits or more below the MSB is rounded off at the time of shifting for digit matching. Similarly, in adding the partial product $X_H \times Y_H$ and the cumulative sum of the partial products $X_L \times Y_L$, $X_L \times Y_H$ and $X_H \times Y_L$, shifting for digit matching and round-off of data which is 2n bits or more below the MSB are carried out. These operations are handled by the BSFT 15. The BSFT 15 also prepares the binary data for the "3" used in the case of square root extraction.

The function of the ALU 16 will now be explained. In multiplication of a scale larger than n-bits times n-bits, once a partial product calculated by the multiplier 10 has been shifted for digit matching in the BSFT 15 and inputted to the SL 18 and thereafter, a partial product from the multiplier 10 has been inputted to the SL 17, the adder 19 of the ALU 16 adds the contents of the SL 17 and the contents of the SL 18. The result is transferred back to the SL 18 and added to the next partial product. In the case where shifting for digit matching is needed before being added to the next partial product, however, the result of the addition is sent to the BSFT 15 via the BUS 14' and after being shifted is transferred to the SL 18.

In division of a scale larger than n bits divided by n bits, on the other hand, the ALU 16 carries out subtraction of the multiplication result from 2 in terms of 2n bits instead of the subtraction by the SBSF 11 in terms of n bits in the same number of machine cycles. When the term $B \cdot x_i$ Equation (93) is for 2n bit by 2n bit multiplication, it is obtained as an output from the adder 19 and for subtracting this from 2, it is necessary to obtain a 2's complement. More specifically, the output of the adder 19 is transferred to the SL 17 or the SL 18, the respective bits are inverted and 1 is added to the LSB. As was mentioned in connection with the explanation of the function of the SBSF 11, this addition of 1 can be omitted.

In square root extraction of a scale larger than n bits, the ALU 16 carries out the calculation of the term $\frac{1}{2}(3-A \cdot A_i^2)$ of Equation (8). The term $\frac{1}{2}(3-A \cdot x_i^2)$ is modified to $\frac{3}{2}-(A \cdot x_i^2)/2$, whereafter the ALU 16 carries out the following operations. The product of the 2n bit by 2n bit multiplication $A \cdot x_i^2$ is obtained as an output of the AU 19. Then, the value 3 generated by the BSFT 15 is transferred to the SL 18, the output of the AU 19 is transferred to the SL L7, both values are shifted right by one bit, the SL 17 inverts the output of the AU 19, and the AU 19 adds the contents of the SL 17 and the contents of the SL 18. This completes the calculation of $3/2-(A \cdot x_i^2)/2$.

As the ALU 16 may have other capabilities in addition to those described in the foregoing, the versatility of the multiplication, division and square root extraction apparatus may obviously be enhanced.

The procedure of the aforesaid multiplication, division and square root extraction will now be explained with reference to certain flowcharts.

Figure 13:
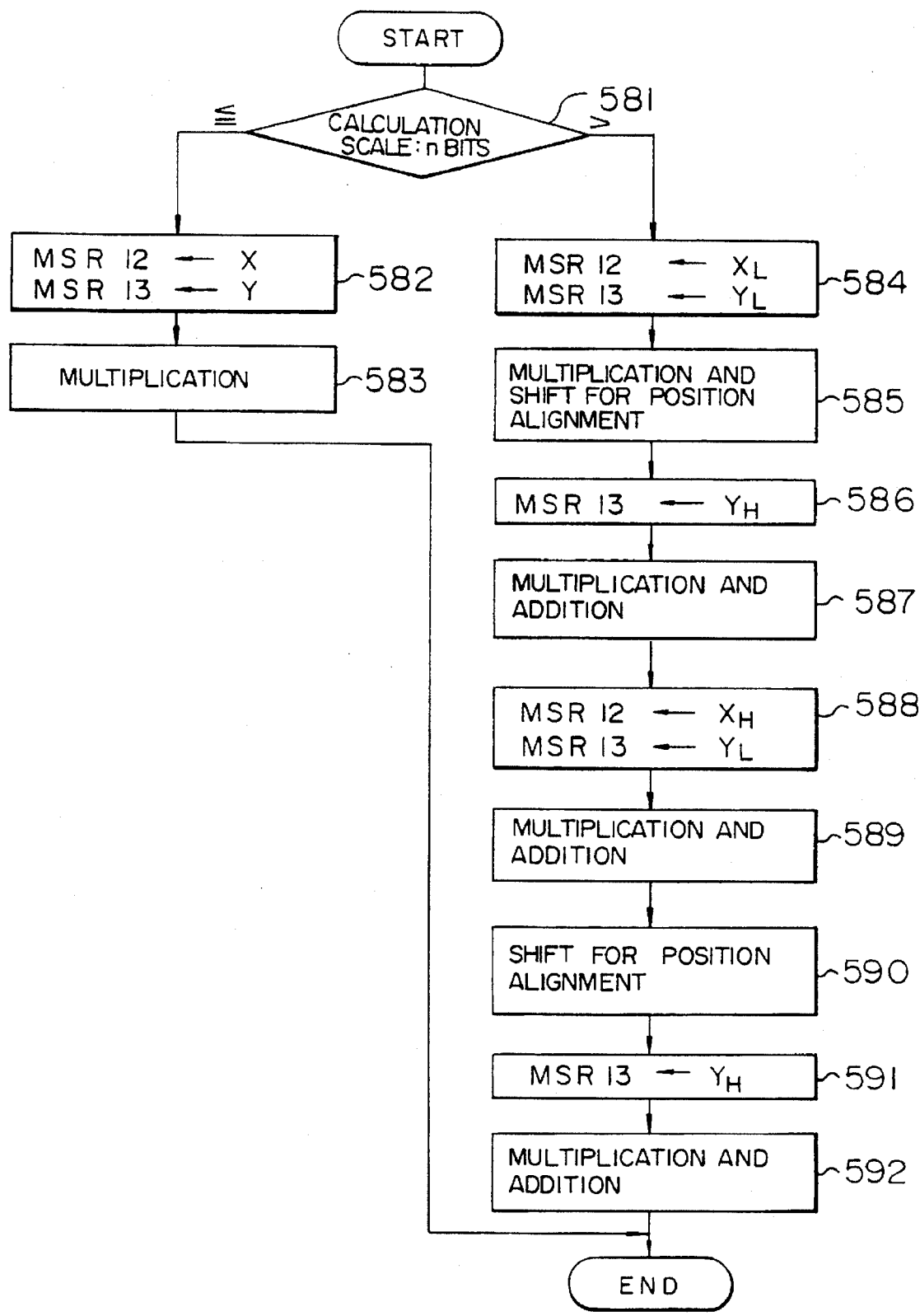
FIG. 13 is a flowchart showing processing steps for multiplication.

FIG. 13 is a flowchart showing the calculating procedure for multiplication. In the present embodiment of the multiplication, division and square root extraction apparatus, the procedure for obtaining the product of X×Y differs depending on whether or not the number of bits of X or Y is greater than n.

To begin with, it is determined whether either of the input data X and Y is larger than n bits (581). If neither is larger than n bits, the procedure advances to step 582, wherein X is inputted to the MSRX 12 and Y is inputted to the MSRY 13. Then, the content (X) of the MSRX 12 and the content (Y) of the MSRY 13 are multiplied in the MULT 10 (583). This completes the multiplication in the case where neither of the data being multiplied are larger than n bits.

In the case where either or both of X and Y are larger than n bits (in this embodiment, data of 2n bits is exemplified for explanation), the procedure advances from step 581 to step 584, in which $X_L$ is inputted to the MSRX 12 and $Y_L$ is inputted to the MSRY 13 (584). Then, the content $X_L$ of the MSRX 12 and the content $Y_L$ of the MSRY 13 are multiplied in the MULT 10 and the result $X_L \times Y_L$ is outputted to the SBSF 11 (in multiplication where the number of bits of the source data is greater than n, the SBSF 11 performs no operation and the result is outputted from the MULT 10 as it is) and then via the BUS 14 to the BSFT 15, in which it is shifted n bits right while filling in zero (585).

In the following step 586, the contents of the MSRY 13 is replaced with $Y_H$, the contents of the MSRX 12 and the contents of MSRY 13 are multiplied, the result of the multiplication $X_L \times Y_H$ is transferred to the SL 17, the results of step 585 are transferred to the SL 18, and the contents of the SL 17 and the SL 18 are added in the AU 19 (587).

Next, $X_H$ is inputted to the MSRX 12 and $Y_L$ is inputted to the MSRY 13 (588). Then, the contents of the MSRX 12 and the contents of the MSRY 13 are multiplied, the result of the multiplication $X_H \times Y_L$ is transferred to the SL 18 via the bus 14, the result of the addition obtained in step 587 is transferred via the bus 14 to the SL 17 in the course of this multiplication, and the contents of the SL 17 and the contents of the SL 18 are added in the AU 19 (589). The result of this addition is transferred via the BUS 14 to the BSFT 15, wherein it is shifted (n−1) bits right while filling in zero (590).

Next, $Y_H$ is inputted to the MSRY 13 (step 591), the contents of then MSRX 12 and the contents of the MSR-Y 13 are multiplied, the result of the multiplication $X_H \times Y_H$ is transferred to the SL 17, the result of shifting in step 590 is transferred to the SL 18 in the course of this multiplication, and finally, the contents of the SL 17 and the content of the SL 18 are added by the AU 19 (592).

This completes the multiplication X×Y.

Figure 14:
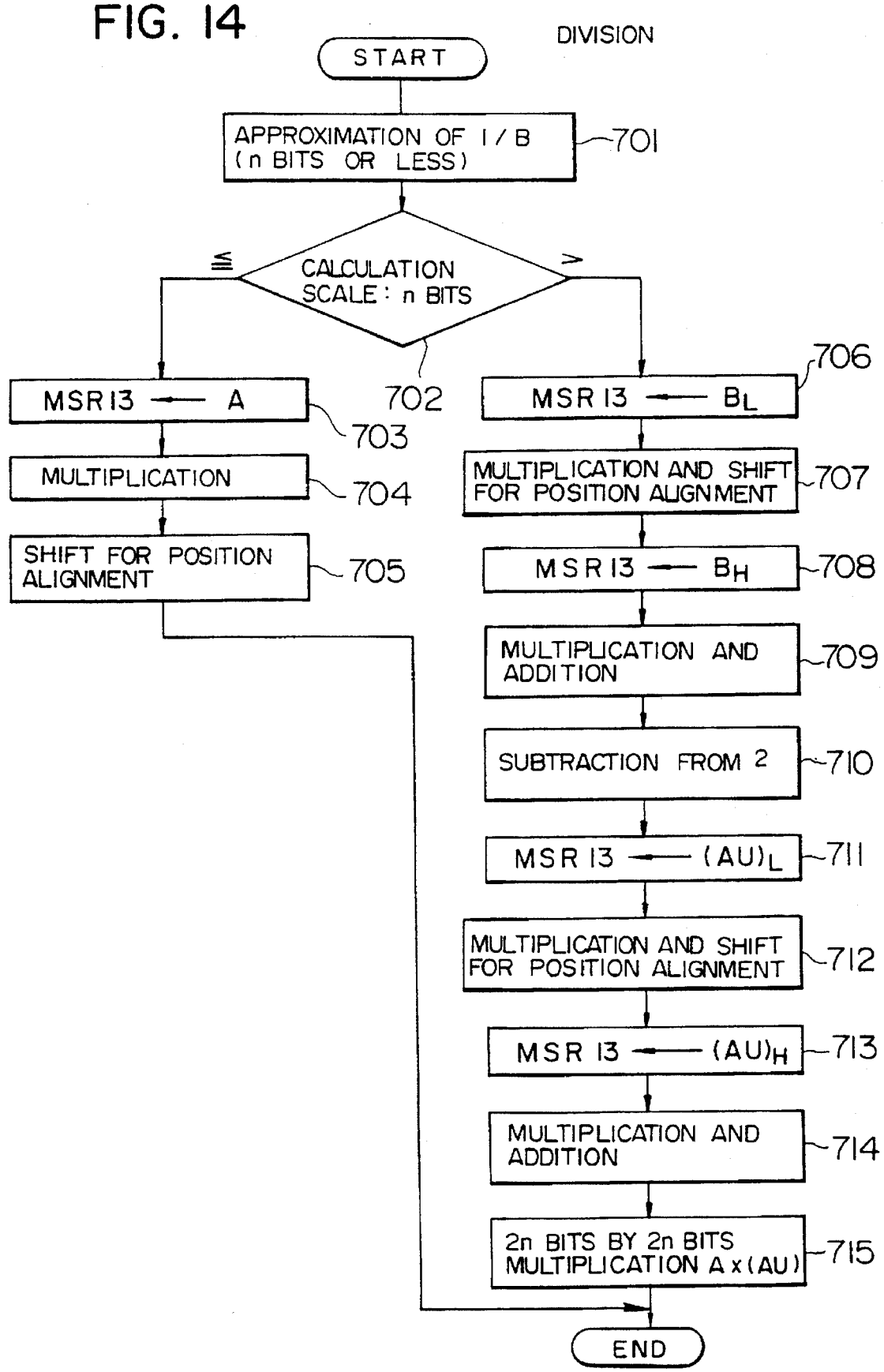
FIG. 14 is a flowchart showing processing steps for division.

FIG. 14 is a flowchart showing the calculating procedure for division. In the multiplication, division and square root extraction apparatus according to the present embodiment, the procedure for division of A÷B differs depending on whether or not the number of bits of the input data A or B is greater than n. In the calculation of A÷B, 1/B in the recurrence formula (3) is first obtained and then (1/B)·A is obtained.

To begin with, irrespective of the number of bits of A, B, an approximation of 1/B is carried out on the basis of the recurrence formula (3) on the assumption that the number of significant digits is n or less. The assumption is that the number of bits of B is n or less, and the calculation is carried out using an n-bit by n-bit multiplication (701). This step 701 will be explained in detail with reference to FIG. 16.

Figure 16:
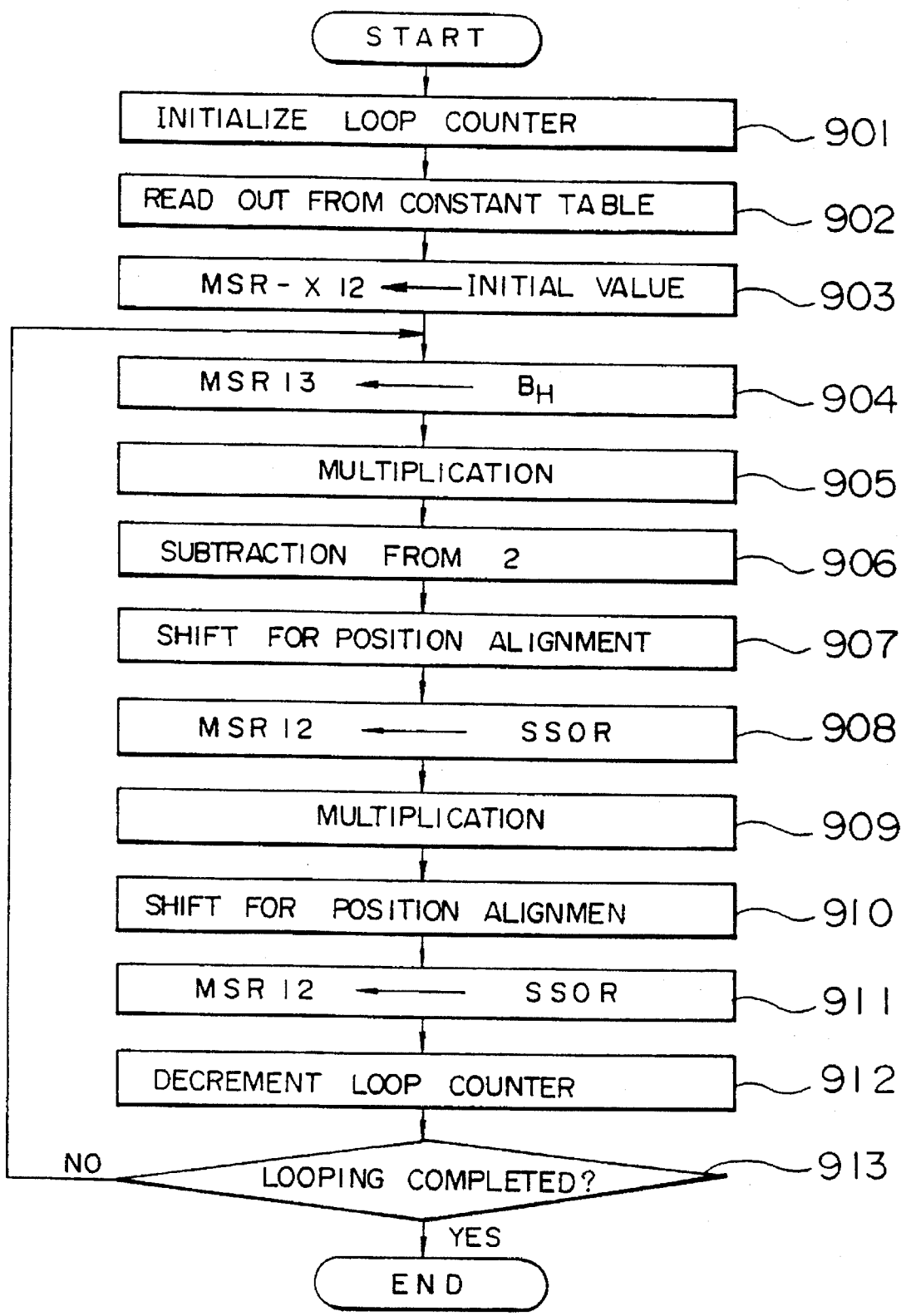
FIG. 16 is a flowchart showing processing steps for approximation of 1/B.

To begin with, in the flowchart of FIG. 16, the number of repetitions of the calculation according to the recurrence formula is set in the LC 211 of the CTRL 21 (901). The number of repetitions is predetermined in the light of the accuracy of the initial value and the precision of the value to be obtained. In the present embodiment, the number of repetitions is set to obtain the maximum accuracy permitted by the calculation using n-bit by n-bit multiplication.

Next, the initial value ($x_i$; i=0) in the calculation according to the recurrence formula is read from the CT 20 in the following manner (902). The divisor B has already been placed on the BUS 14. Assuming that the data on the BUS 14H at the time of reading the initial value is $b_{2n-1}b_{2n-2} \cdots b_{n+1}b_n$, the (m−1)-bit data $b_{2n-2}b_{2n-3} \cdots b_{2n-m}$ is inputted to the CTAR 201. This is because the multiplication, division and square root extraction apparatus handles floating point mantissa data so that the value of the integer bit $b_{2n-1}$ on the BUS 14H is invariably 1. The l-bit initial data corresponding to the address read by the CTAR 201 is read from the CTM 202. The output of the CTM 202 is set in the CTOR 203. The data width of the CTOR 203 is 2n bits in this embodiment, but may be narrower. The data width l of the data outputted by the CTM 202 is (m−1) bits or more. However, in the case of division, the range from which the initial value can be selected is, in consideration of the reciprocal of a number between 1 and 2, $1/2 < x \leq 1$. The initial value of decimal 1 is defined in binary notation as 0.111 .. . Therefore, the integer bit and the first bit below the binary point of the initial value are zero and 1, respectively. The CTM 202 has a logic circuit which, at the time of storing the initial value in the CTOR 203 for a division in which the data width of the CTM 202 can be set to be of the second digit or less below the binary point, enters 0 or 1 into the integer bit and the first bit below the binary point. Alternatively, it is possible to increase the accuracy of the initial value without changing the data width l. A predetermined fixed value is entered into the lower 2n−l−2 bits of the CTOR 203.

The initial value set in the CTOR 203 is inputted to the MSRX 12 via the BUS 14 (903). On the other hand, the divisor B is inputted to the MSRY 13 (904). Then, the contents of the MSRX 12 and the contents of the MSRY 13 are multiplied in the MULT 10 (905). Thus, the term $B \cdot x_i$ of Equation (3) is calculated.

Next, the result of the multiplication $B \cdot x_i$ is subtracted from 2 by the SUB 111 to calculate the term ($2-B \cdot x_i$) in Equation (3) (906). The SFT 112 shifts the result of the subtraction ($2-B \cdot x_i$) one bit left while filling in zero and the result is set in the SFC 114 and the SSOR 113 (907). Thus, the binary point is matched. Then the upper n bits of the contents of the SSOR 113 are inputted to the MSRY 13 via the BUS 14H (908).

In the following step 909, the contents of the MSRX 12 and the contents of the MSRY 13 are multiplied in the MULT 10. As $x_i$ remains in the MSRX 12 at that time, the multiplication of step 909 gives $x_i(2-B\cdot x_i)$. The SUB 111 forwards the result of this multiplication to the SFT 112 without performing any operation thereon and the SFT 112 performs a left shift for matching the binary point position (910). The shifted result is set in the SSOR 113 and the upper n bits of the contents of the SSOR 113 are inputted to the MSRX 12 via the BUS 14H (911). As a result of the foregoing procedure, the substitution $(x_i\cdot(2-B\cdot x_i) \to x_{i+1})$ of the right side of the recurrence formula (3) into the left side is carried out.

Next, the content of the LC 211 is decremented by the DEC 212 in step 912 and the decremented value is set in the LC 211, after which the procedure returns to step 904 (913). The aforesaid steps 904 to 913 are repeated until the value of the LC 211 becomes zero. If the contents of the LC 211 satisfy the condition for termination of the calculation, the CTRL 21 terminates the operation and causes the procedure to advance to step 702 in FIG. 14.

In step 702 of FIG. 14, it is determined whether the number of bits of A or B is larger than n. If not, the procedure moves to step 703 in which A is inputted to the MSRY 13. At that time, the MSRX 12 is holding the value $(=x_{i+1})$ of 1/B of significant digit number being n bits or less as a result of the procedure described in connection with step 701. Then, in the following step 704, the contents of the MSRX 12 and the contents of the MSRY 13 are multiplied in the MULT 10. The result of this multiplication passes through the SBSF 11 following the MULT 10 without modification and is inputted to the SFT 112, in which a left shift is conducted to match the binary point position (705), and is then inputted to the SFC 114 and the SSOR 113. This completes the division A÷B.

In the case where A or B is larger than n bits, the procedure goes from step 702 to step 706, in which the lower bits $B_L$ of the divisor B are inputted to the MSRY 13. Then, the contents of the MSRX 12 and the contents of the MSRY 13 are multiplied in the MULT 10 (707). The result of this multiplication $B_L\cdot x_i$ is passed through the SBSF 11 and the SFT 112 without modification to the BSFT 15, where it is shifted (n−1) bits right while filling in zero for digit matching and is rounded off (707). In the following step 708, the upper bits $B_H$ of the divisor B are inputted to the MSRY 13. Then, in the same manner as above, the contents of the MSRX 12 and the contents of the MSRY 13 are multiplied, the result of the multiplication $B_H\cdot x_i$ is transferred to the SL 17 via the BUS 14, the result of the shift operation in step 707 is transferred from the SBFT 15 to the SL 18 in the course of this multiplication, and the contents of the SL 17 and the contents of the SL 18 are added in the AU 19 (709). The result of this multiplication $(B_H+B_L)\cdot x_i$ is transferred via the bus 14 to the SL L7 to be inverted for taking 1's complement or to be inverted so that the LSB is added with 1 to take a 2's complement, and the term $(2-B\cdot x_i)$ of Equation (3) is obtained in the AU 19 (710).

Next, for multiplying the result of this calculation AU= $(2-B\cdot x_i)$ by $x_i$, the approximated value of 1/B stored in MSRX 12, the lower n bits of AU, $AU_L$, are transferred to the MSRY 13 via the BUS 14L (711). The MULT 10 then multiplies the contents of the MSRX 12 and the contents of the MSRY 13, and the result of the multiplication $AU_L\cdot x_i$ is sent to the BSFT 15 without modification for digit matching (shifted (n−1) bits right while filling in zero) and is rounded off (712). Next, the upper n bits of AU, $AU_H$, are transferred to the MSRY 13 via the BUS 14 (713) and the contents of the MSRX 12 and the contents of the MSRY 13 are multiplied in the MULT 10. In the course of this multiplication, the result of the shift operation in step 712 is transferred from the BSFT 15 to the SL 18, while the result of the current multiplication $AU_H\cdot x_i$ is transferred to the SL 17, and the two are added in the AU 19 (714).

Next, in step 715, the 2n-bit A and the $AU\cdot x_i=1/B$ obtained in the foregoing manner are multiplied in the manner explained with reference to FIG. 13 (715), thus completing the calculation of the division A÷B.

Figure 15:
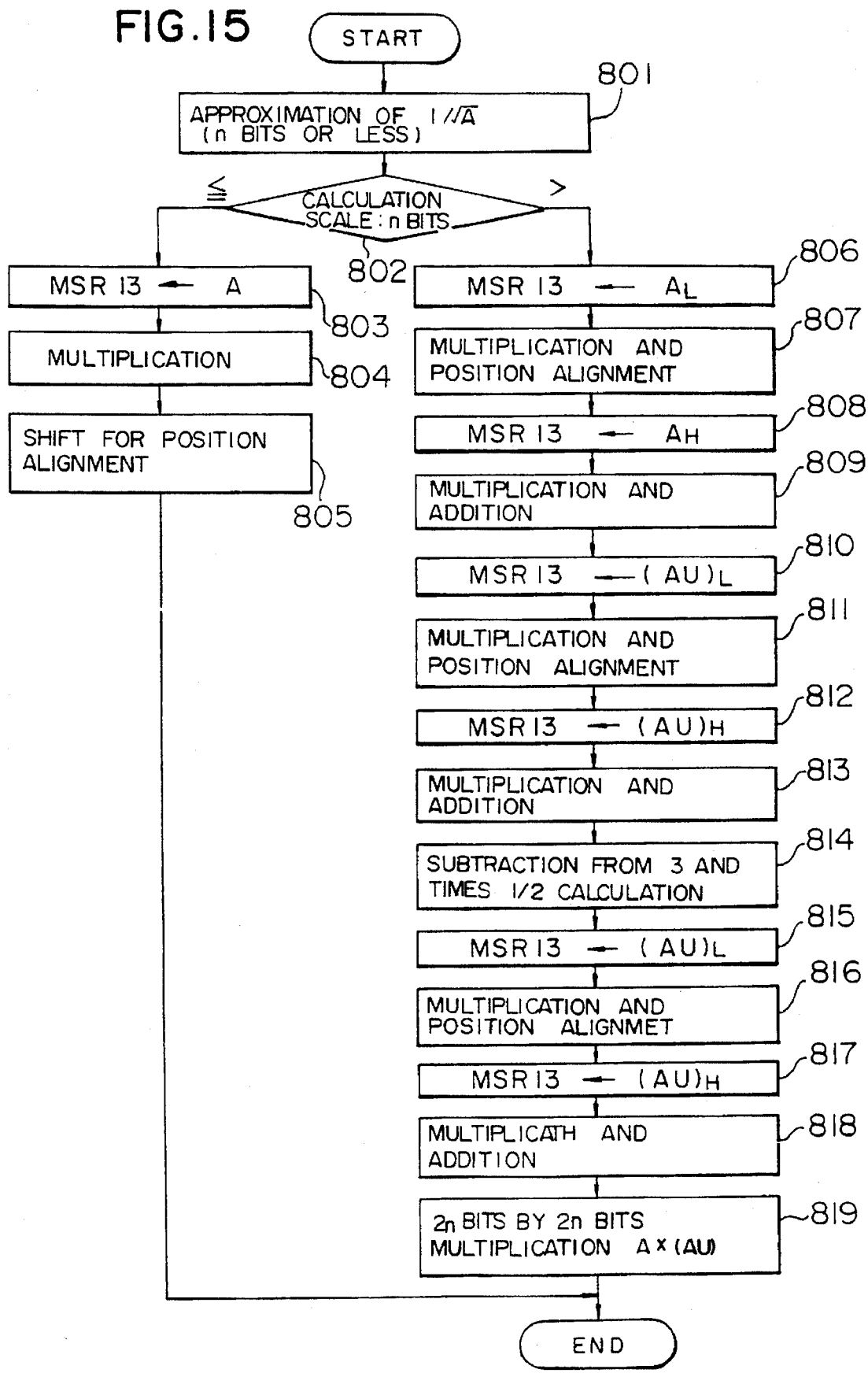
FIG. 15 is a flowchart showing processing steps for square root extraction.

FIG. 15 is a flowchart showing the calculating procedure for square root extraction. In the multiplication, division and square root extraction apparatus according to the present embodiment, the procedure of square root extraction differs depending on whether or not the number of bits of the input data A is greater than n. First $1/\sqrt{A}$ is obtained using the recurrence formula (8) of the Equation (7) and then the result is multiplied by A to obtain $\sqrt{A}$.

To begin with, irrespective of the number of bits of A, approximation of $1/\sqrt{A}$ is carried out on the basis of the recurrence formula (8) on the assumption that the number of significant digits is n or less (801). The assumption is that the number of bits of A is n or less, and the calculation is carried out using an n bits by n bits multiplication. This step 801 will be explained in detail with reference to the flowchart of FIG. 17.

Figure 17:
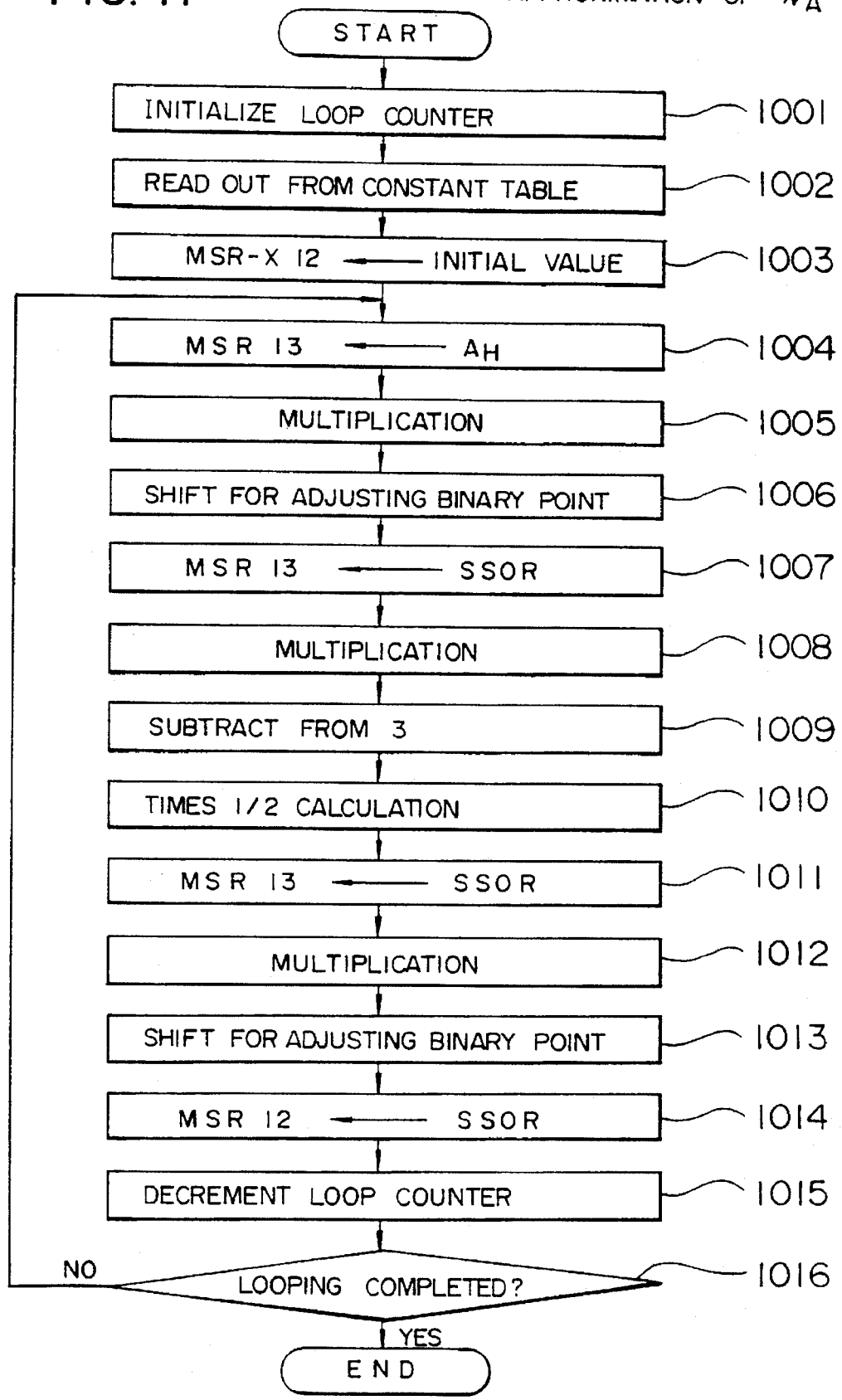
FIG. 17 is a flowchart showing processing steps for approximation of 1/A.

To begin with, in the flowchart of FIG. 17, the number of repetitions of the calculation according to the recurrence formula (8) is set in the LC 211 of the CTRL 21. As in division, the number of repetitions is decided beforehand. Next, the initial value $(x_i; i=0)$ in the calculation according to the recurrence formula (8) is read from the CT 20 (1002). The procedure is the same as that for division. In square root extraction, however, if the exponent is an odd number and the method is employed wherein the calculation is conducted after the exponent has been modified to an even number by dividing the mantissa by 2, the integer bit of the mantissa will not necessarily be 1. Thus, while the value of the number A whose root is to be obtained is placed on the BUS 14, if the data on the BUS 14H is $b_{2n-1}b_{2n-2}\ldots b_{n+1}b_n$, the m−1 bit data $b_{2n-1}b_{2n-2}\ldots b_{2n-(m+1)}$ is inputted to the CTAR 201. The contents of the CTAR 201 are used as an address for reading out the corresponding 1-bit initial value from the CTM 202. While the output of the CTM 202 is set in the CTOR 203, since in square root extraction the range from which initial values can be selected is $1/\sqrt{2}<x\leq\sqrt{2}$, the integer bit of the initial value is not necessarily 1. Therefore, in contrast to the case of division, the integer bit cannot be set in advance.

The initial value read from the CTOR 203 is forwarded to the MSRX 12 though the BUS 14 (1003). The number A whose root is to be found is inputted to the MSRY 13 (1004). The contents of MSRX 12 and the contents of the MSRY 13 are multiplied. Thus, the term $A\cdot x_i$ of Equation (8) is calculated (1005). The SFT 112 carries out a 1-bit left shift with respect to the result of the multiplication for matching the position of the binary point. The result is inputted to the SFC 114 and the SSOR 113 (1006). The upper n bits of the contents of the SSOR 113 are forwarded to the MSRY 13 through the BUS 14H (1007). The contents of the MSRX 12 and the contents of the MSRY 13 are multiplied (1008). As the MSRX 12 holds the value of $x_i$, the $A\cdot x_i^2$ term of the Equation (8) is obtained.

Next, the SUB 111 subtracts the result $A\cdot x_i^2$ of the multiplication from 3 (1009). Thus, the term $(3-A\cdot x_i^2)$ of Equation (8) is calculated. In this case, the SFT 112 inputs the result of the subtraction to SSOR 113 without conducting a shift. As a consequence, the result of the subtraction is relatively shifted one bit to the right, whereby the term $\frac{1}{2}\cdot(3-A\cdot x_i^2)$ of Equation (8) is calculated (1010).

The upper n bits of SSOR 113 are forwarded to the MSRY 13 through the BUS 14H (1011). The contents of MSRX 12 and the contents of the MSRY 13 are multiplied (1012). As the MSRX 12 holds the value of $x_i\cdot\frac{1}{2}\cdot(3-A\cdot x_i^2)$ term on the right side of the Equation (8) is obtained. The SFT 112 carries out a left shift with respect to the result of the multiplication for matching the position of the binary point (1013). The upper n bits of the contents of the SSOR 113 are then forwarded to the MSRY 12 through the BUS 14H (1014). As a result, substitution of the right side into the left side of the recurrence formula is carried out. The content of the LC 211 is decremented by the DEC 212 and the resulting value is inputted to the LC 211 (1015). If the contents of the LC 211 satisfy the condition for termination of the calculation, the CTRL 21 terminates the procedure. Otherwise, it returns the procedure to step 1004 (1016). This concludes the procedure for approximating $1/\sqrt{A}$ and the procedure goes to step 802 in FIG. 15. At the termination of the procedure of FIG. 17, the MSRX 12 holds the approximated value of $1/\sqrt{A}$.

In step 802 of FIG. 15, it is determined whether or not the number of bits of A is larger than n. If A is n bits or smaller, the procedure goes to step 803 in which A is inputted to the MSRY 13. Then, the contents of the MSRX 12 and the contents of the MSRY 13 are multiplied by the MULT 10 (804). At that time the MSRX 12 holds the approximated value of $1/\sqrt{A}$ obtained in step 801. The result of the multiplication is passed through the SUB 111 without modification to the SFT 112, in which it is shifted left for binary point matching while filling zero (805). The shifted result is inputted to the SFC 114 and SSOR 113, concluding the square root extraction. As a result, the SSOR 113 holds the square root $\sqrt{A}$.

If it is determined in step 802 that A is larger than n bits, the procedure advances to step 806, in which the lower n bits $A_L$ of A are stored in the MSRY 13. Next, the contents of the SL 17 and the contents of the SL 18 are multiplied in the MULT 10, the result of the multiplication is transferred without modification to the BSFT 15, in which it is shifted (n−1) bits right for digit matching while filling in zero and is rounded (807). Then, the upper n bits $A_H$ of A are inputted to the MSRY 13 (808), the contents of the MSRX 12 and the contents of the MSRY 13 are multiplied by the MULT 10, and the result of the shift operation by the BSFT 15 in step 807 is transferred to the SL 18 in the course of this multiplication. Further, the result of the present multiplication is passed through the SUB 111 without modification to be shifted for binary point matching in the SFT 112 and is transferred to the SL 17 through the BUS 14. Next, the contents of the SL 17 and the contents of the SL 18 are added in the AU 19 (809). The result of the addition is denoted as "AU".

Next, the lower n bits $AU_L$ of the result of the addition AU by the adder 19 are transferred via the BUS 14L to the MSRY 13, where they are stored (810). Then, the contents of the MSRY 12 and the contents of the MSRY 13 are multiplied in the MULT 10 and the result of the multiplication is transferred without modification to the BSFT 15, in which it is shifted n bits to the right for digit matching while filling in zero (811).

Next, the lower n bits $AU_H$ of the output AU of the AU 19 are transferred via the BUS 14H to the MSR 13 for storage (812). Then, the contents of the MSRX 12 and contents of the MSRY 13 are multiplied in the multiplier 10 and the result of the multiplication is transferred through the SUB 111 without modification to the SFT 112, where it is shifted for binary point position matching, and then via the BUS 14 to the SL 17. In the course of the multiplication, the result obtained in the BSFT 15 in step 811 is transferred to the SL 18. Then, the contents of the SL 17 and the contents of the SL 18 are added in the AU 19 (813). The result of this addition is returned to the SL 17 via the BUS 14 and for ½ times processing, the leftmost bit is filled with zero, one bit shift is effected to the right and inversion is done. Further, the decimal value or 3/2 generated in the BSFT 15 by shifting one bit right with filling of zero into the leftmost bit is transferred to the SL 18 and the contents of the SL 17 and the contents of the SL 18 are added in the AU 19 (814). As a result, subtraction from 3 and ½ times processing are accomplished.

Next, exactly the same procedures as those in steps 810–813 are repeated using the result of the addition obtained in the AU 19 in step 814 and the value (the approximation of $1/\sqrt{A}$) stored in the MSRX 12 (815–818). The result of the addition obtained in the step 818 is the approximation of $1/\sqrt{A}$ and is twice as accurate as the approximated value obtained in step 801. Therefore, if the 2n-bit result of addition obtained in step 818 and the number A (2n bits) whose square root is to be obtained are multiplied as explained in connection with FIG. 13, the desired 2n-bit square root $\sqrt{A}$ can be obtained as the result from the AU 19 (819).

Another embodiment of the invention will now be described to consider the relation between the arithmetic unit and a solution obtained thereby.

Figure 18:
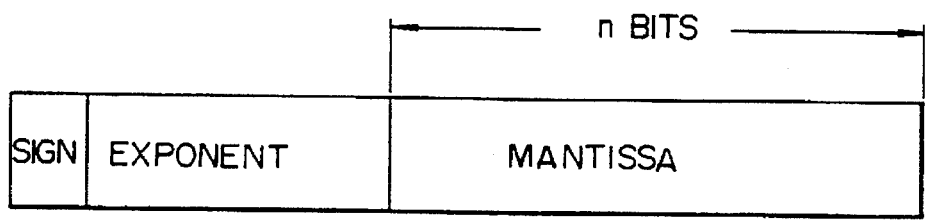
FIG. 18 is a diagram showing the manner to express the floating point number.

It is difficult for ordinary programmers to describe a floating point operation program for floating point data as shown in FIG. 18 because expert knowledge is required and therefore it has been the practice that an expect programmer prepares libraries and an ordinary programmer uses them. Presently, these libraries have the function to operate not only addition, subtraction, multiplication and division, but also extraction of the square root and elementary functions.

Further, in recent years, a computer has been available which has, as an instruction, the function of carrying out functional operations by using floating point data.

(a) Technique for Division and Extraction of the Square Root

The technique presently used for realizing extraction of the square root and division is principally classified into two methods. One is the dichotomy which uses the theorem of intermediate value and the interval reduction technique to conduct solving digit by digit and the other is the approximation as represented by the Newton-Raphson iteration.

(b) Requirement of Strict Solution for Standardization (IEEE Standard)

In the main frames and the minicomputers, data formats of floating point numbers and the operation accuracies thereof are different for different makers and therefore exchangeability of program and data is not permitted, thus degrading translation capability of software. The existing problems are reflected upon and standardization has been promoted in the industry in conformity with the common international standard (IEEE 754 standard). The IEEE 754 standard regulates data format, arithmetic results, branch condition, method of exception processing and the like to insure a very high translation capability. Till now, standardization conformable to the IEEE standard has been in progress through out the microcomputer industry and the application of this standard will further be extended.

The IEEE 754 standard asks for strict solutions in the basic arithmetic processing consisting of addition, subtraction, multiplication and division as well as extraction of the square root. The strict solution coincides with the answer standing for rounded arithmetic results which can be expressed with infinite accuracy and over infinite expression range.

(c) Method of Obtaining Strict Solution with Finite Arithmetic Unit

Practically, it is impossible to obtain solutions of infinite accuracies in order to obtain strict solutions in division and extraction of the square root. Therefore, the dichotomy is used for solving with accuracy can formable to necessary digit and intermediate results of the dichotomy are used to obtain a solution which coincides with that of infinite accuracy.

Figure 19:
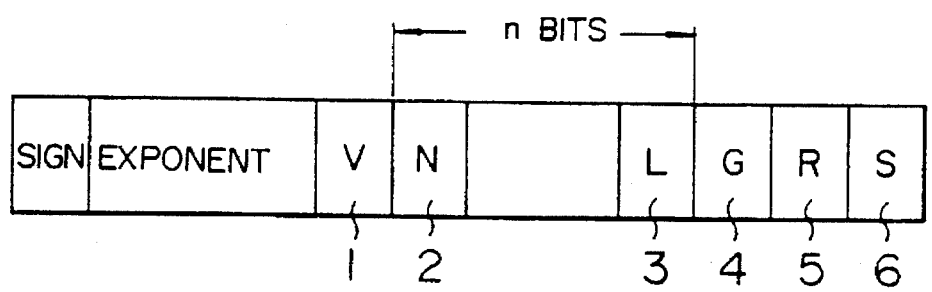
FIG. 19 is a diagram showing a data format for obtaining strict solutions by using operation resources of finite length.

The IEEE committee advocates a method using three flags in order to perform calculation with a floating point arithmetic unit of finite length data format. FIG. 19 shows a data expression form used for obtaining strict solutions with finite arithmetic resources. In FIG. 19, 1 designates an overflow bit, 2 an MSB bit, 3 an LSB bit, 4 a G (guard) bit, 5 an R (round) bit and 6 an S (sticky) bit. The mantissa is n+3 bits and the three bits having smaller weights than that of the LSB are called G, R and S flags. The G bit and R bit represent the (n+1)th and (n+2)th bits, respectively, and the S bit stores the results of the O-ring of infinitely small bits starting from the (n+3)th bit.

Figure 4:
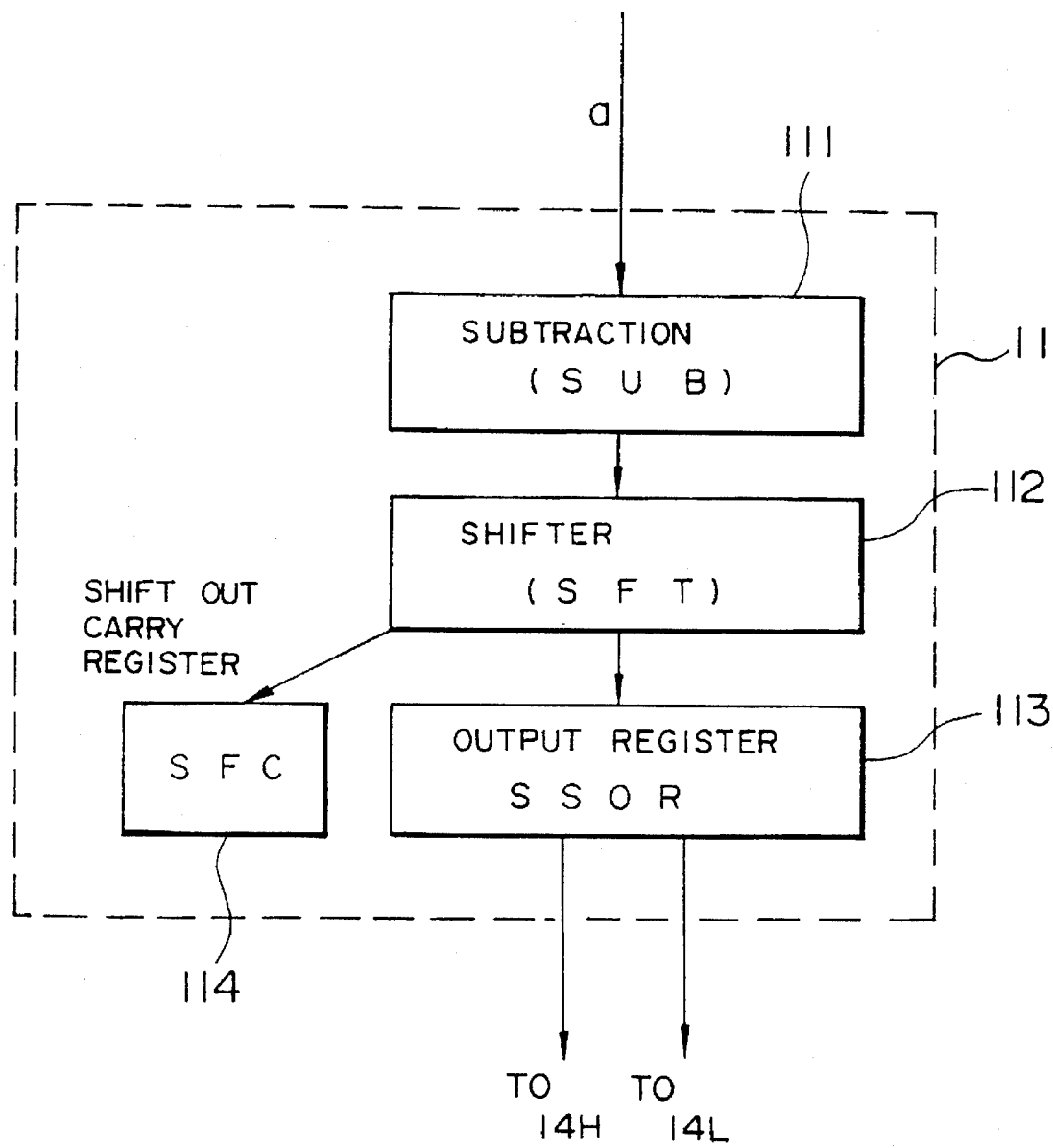
FIG. 4 is a detailed block diagram of the subtraction/shift circuit.

By obtaining the aforesaid (n+3)-bit string correctly and applying the succeeding round-off operation to the bit string, an n-bit strict solution can be obtained. The IEEE 754 standard regulates the round-off mode, FIG. 4 shows a table for obtaining the results of round-off from the G.R and S bits in accordance with different round-off modes. It is to be noted that "–" in FIG. 20 indicates no change.

(d) Dichotomy

Figure 21:
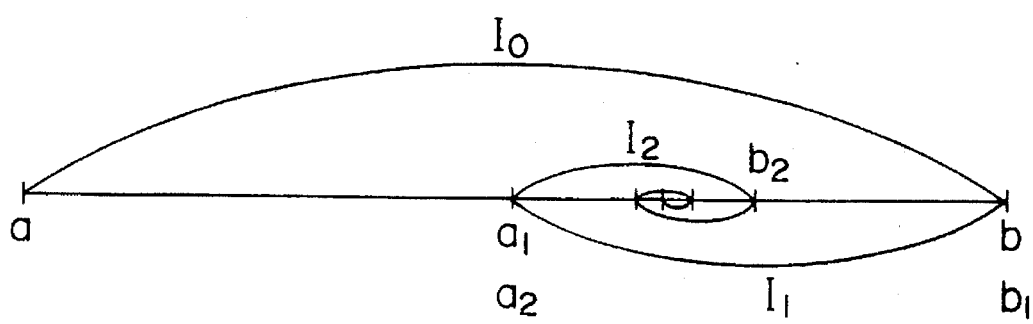
FIG. 21 is a diagram showing the principle of dichotomy.

The principle of the dichotomy will be described with reference to FIG. 21. The dichotomy is the application of a mathematical theorem called the theorem of intermediate value and interval reduction technique and is referred to on pp. 56 to 76 of the publication indicated at (b) in the column "reference literatures" to be described later. As shown in FIG. 21, in the dichotomy, a closed interval I0=[a, b] is halved and either one of the halves is defined as I1=[a1, b1]. Subsequently, I1 is also halved to provide either one of the halves which is defined as I2 and the above procedure is repeated to prepare a reduced interval string of I0 ⊃I1 ⊃. . .

If f(x) is continuous within an interval [a, b] and f(a)≦y0, f(b)>y0, ξ satisfying f(ξ)=y0 exists, without fail, within an interval a≦ξ<b. When calculation is repeated wherein for central points $c_j$ taken in respect of individual intervals $I_j=[a_j, b_j]$ (a0=a, b0=b).

$a_{j+1}=c_j$ and $b_{j+1}=b_j$ are set if $f(c_j)≦y0$ and $a_{j+1}=a_j$ and $b_{j+1}b_j$ are set if $f(c_j)>y0$, and then $I_j=[a_{j+1}, b_{j+1}]$ is determined, the ξ is obtained as the common part (limit) of the reduced interval string of I0 ⊃I1 ⊃. . .

(e) Nature of Approximate Solution

There are available various methods of obtaining approximate solutions to division and square root, such as Newton-Raphson iteration, the CORDIC method and Taylor expansion, and especially the aforesaid Newton-Raphson iteration is often used because of speed of convergence.

For the aforesaid study, reference to the following publications will be useful.

(a) IEEE Standard 754-1985 for Binary-Floating-Point Arithmetics, IEEE, 1985.

(b) "Numerical Calculation of Elementary Function" by HitotsuMatsu, Educational Publish, 1984.

(c) Coonen, J. L., "An Implementation Guide to a Proposed Standard for Floating-Point Arithmetic", IEEE Computer, January 1980.

The dichotomy is effective to obtain strict solutions, but it requires condition decision operations which are greater in number than the digits desired to be obtained, with the result that the operation speed is proportional to the number of digits and solutions can not be obtained at high speeds. While, thanks to development in arithmetic hardware dedicated to multiplication and the like processing, the time required for multiplication and the like processing is improved drastically, the condition decision must be performed once during one machine cycle and the cost of decision still remains high.

On the other hand, the approximation such as the Newton-Raphson iteration is effective to obtain solutions at high speeds in operation of division and square root extraction, but the bit string of obtained digits is sometimes incorrect and strict solutions can not be obtained.

The advent of the arithmetic algorithm is desired wherein the number of iterations can be decreased, in contrast to the dichotomy, for the sake of processing or calculating strict solutions to square root extraction and division with high efficiency and all bits can be determined correctly. This embodiment provides such arithmetic algorithm.

In order to provide a highly efficient division and root square algorithm, approximate solutions are calculated through, for example, the Newton-Raphson iteration and the resulting bit string is corrected using addition, subtractien and multiplication. If accuracies of the approximate solutions are high, all bits can be accurately corrected. If accuracies of the approximate solutions are low, only a higher bit string is corrected and then the dichotomy is restarted.

The aforesaid procedure will now be explained in detail by following the steps.

(a) Calculation of Approximate Solutions Having Certain Accuracy

Various methods of calculating approximate solutions are available and they can confine the calculated approximate solutions within a constant error range around the true value. Further, the magnitude can be set to be constant in respect of weights of some bits of the mantissa. Therefore, by using the approximate solution and the maximum error, the range in which the strict solution exists can be limited.

(b) Recovery of Correct Bit String

It is determined which one of numerical values present in the strict value existent range gathered from the approximate solution and maximum error corresponds to the strict solution by substituting individual numerical values into inverse functions and comparing the inverse function values with arguments.

(c) Start of the Dichotomy on the Way

When the maximum error is relatively large, many numerical value expressions exist in the range within which the strict solution can exist. Therefore, in effect, the dichotomy may be used to gather the strict solution from the numerical value expressions.

(d) Generation of G, R and S Bits

For gathering of the strict solution, the existent range is narrowered by the number of digits which is two digits larger than the number of digits of the strict solution to be determined, and values of the G and R bits are determined. Further, a determined value y containing the G and R bits is substituted into an inverse function and the S bit is obtained by determining $f^{-1}(y')-x$.

(e) Generation of Strict Solution

The strict solution is determined from the G, R and S bits through the round-off mode.

In the arithmetic procedure in accordance with the present embodiment, the cycle of decision processing can be decreased in the course of operation as will be discussed below. The dichotomy can afford to extract information for only one bit from one operation and therefore it requires 55 cycles of decision processing in order to obtain strict solutions to square root extraction and division by using, for example, the double precision format pursuant to the IEEE 754 standard.

On the other hand, a hybrid method according to the present embodiment needs 6 to 7 cycles of decision processing to obtain the same results. The difference in the number of decision processings directly implies a potential reduction in the arithmetic machine cycle.

The provision of a dedicated multiplier can permit multiplication to be completed through one machine cycle regardless of the number of digits of the argument. In the past, multiplication was a processing which consumed many machine cycles, but at present, thanks to development in LSI technology, multiplication can be conducted similarly to addition and subtraction. Accordingly, the use of multiplication by the present embodiment will never lead to a shortcoming thereof.

The following description will be given in detail of the case of square root extraction.

Figure 22:
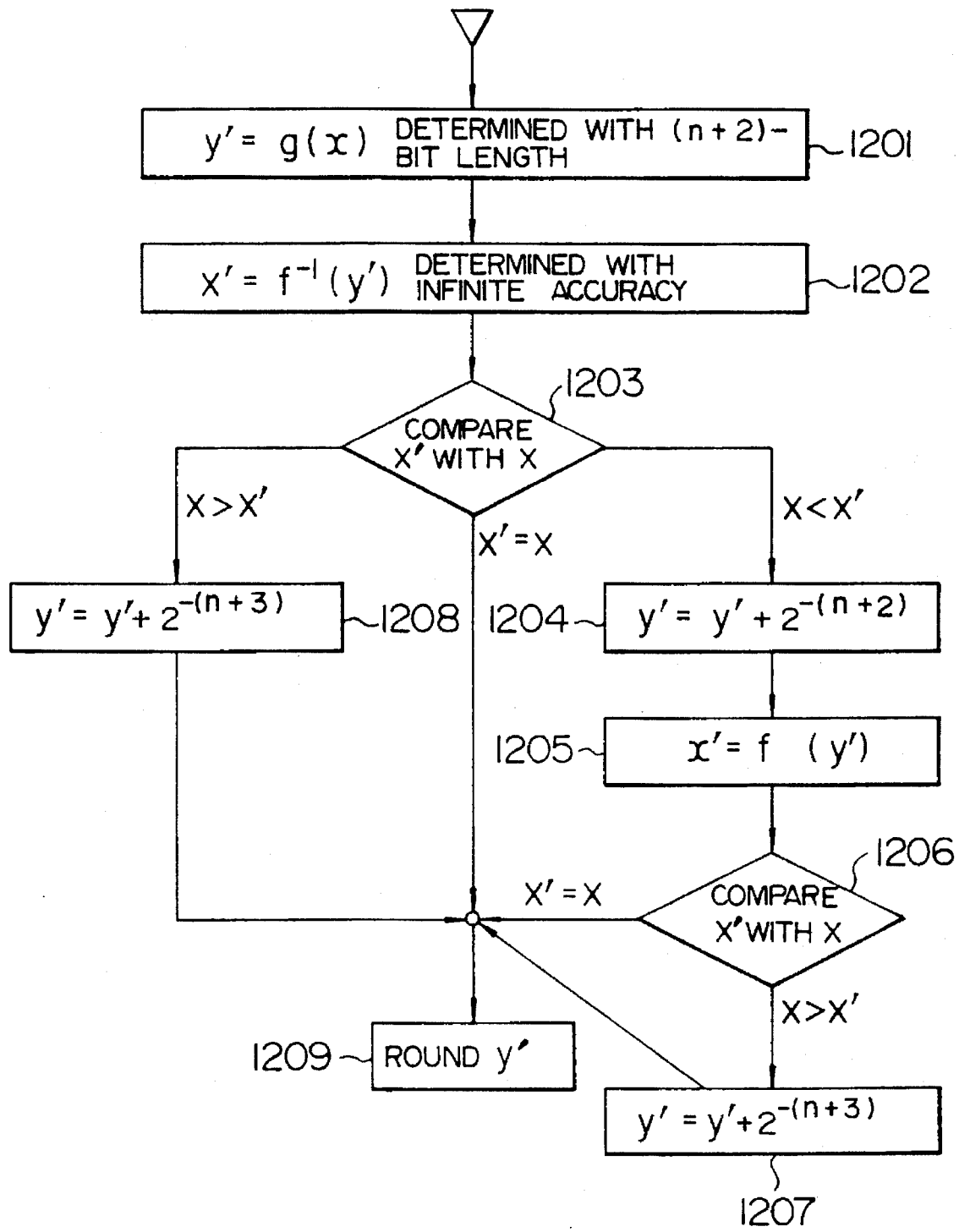
FIG. 22 is a diagram showing a schematic flow of the algorithm.

FIG. 22 shows a schematic flow of an algorithm, in which in the figure, f(x) denotes a function desired to be determined, g(x) an approximate function of f(x), where $|g(x)-f(x)| \leq \epsilon_o$, and $f^{-1}(x)$ an inverse function of the function desired to be determined. In the figure, step 1201 represents a calculation of approximate solutions, 1202 the use of the inverse function, 1203 a comparison of the inverse function value with the argument, 1204 a modification of the bit string, 1205 the use of the inverse function, 1206 a comparison of the inverse function value with the argument, 1207 and 1208 a determination of the S bit and 1209 a round-off operation.

Figure 23:
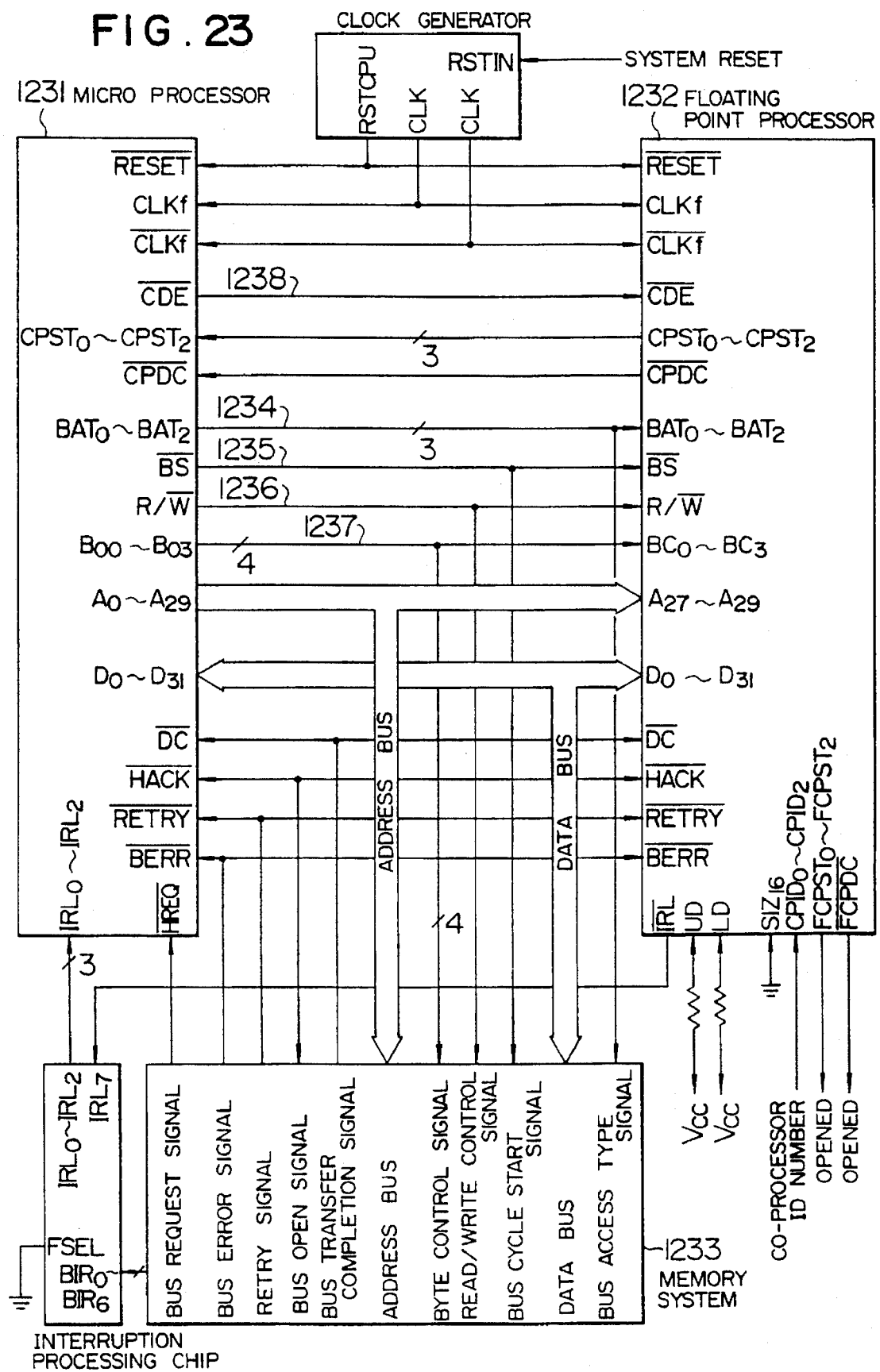
FIG. 23 is a diagram showing the internal arrangement of the floating point processor.

FIG. 23 shows an example of a system using a floating point processor. The system comprises a microprocessor 1231 (hereinafter simply referred to as MPU), a floating point processor 1232 and a memory system 1333. The floating point processor 1232 is a slave of the MPU 1231 and responds to commands received from the MPU 1231 through processor control lines 1234 and 1238 to take part in executing instructions of the MPU.

Figure 24:
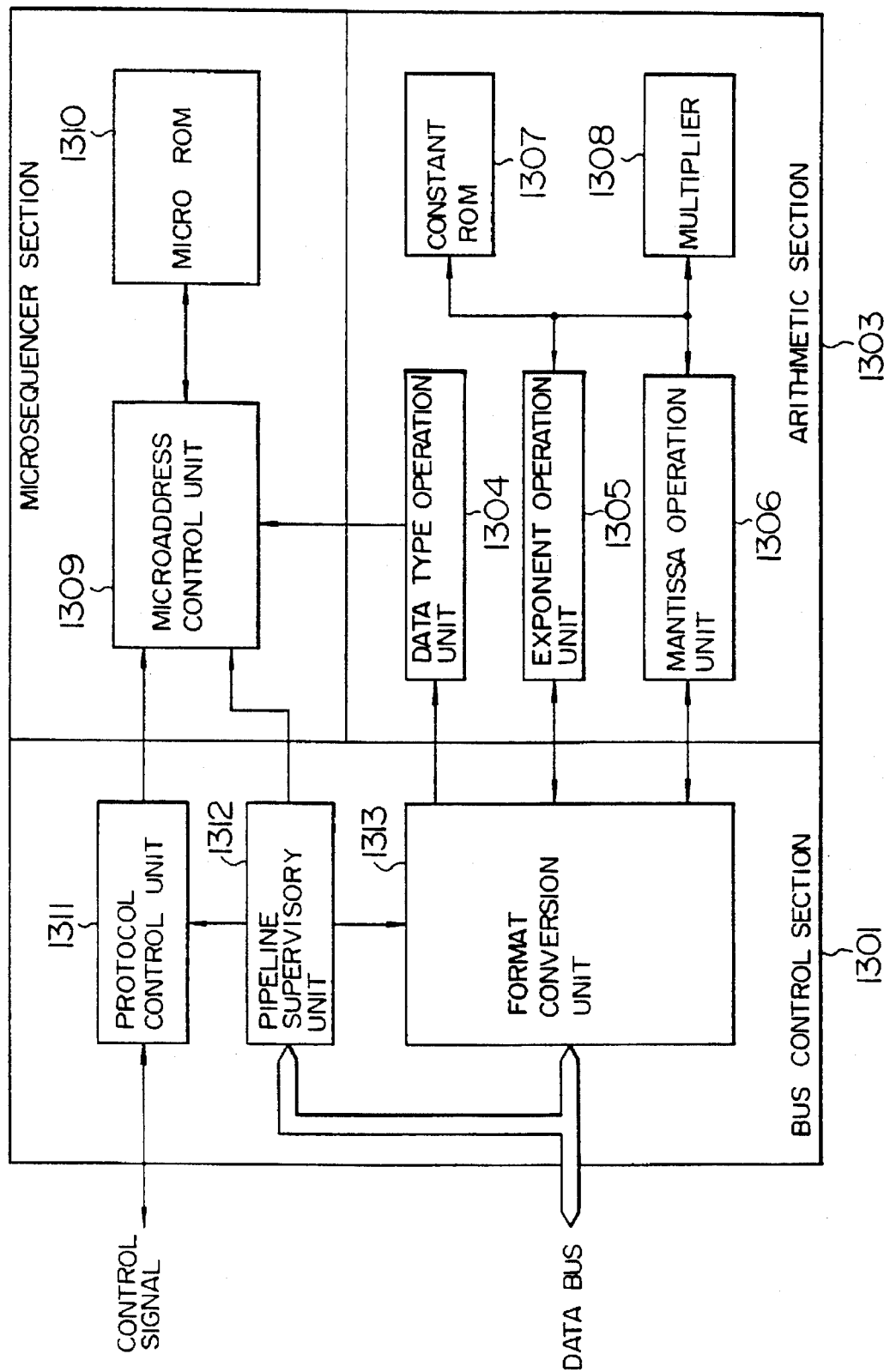
FIG. 24 is a diagram showing the internal arrangement of the floating point processor.

FIG. 24 shows the internal arrangement of the floating point processor 1232. The floating point processor consists of three major sections. A bus control section 1301 is a section acting as an interface to the external inclusive of the MPU. A microsequencer section 1302 is a section for storing an algorithm in the form of a microprogram for floating point calculation and for executing the stored contents. An arithmetic section 1303 is a section which performs actual operations under the command of the microsequencer 1302. The arithmetic section includes a data type operation unit 1304, an exponent operation unit 1305, a mantissa operation unit 1306, a constant ROM 1307 and a multiplier 1308. The data type operation unit 1304 recognizes the positive/negative sign of special data, such as infinity, a non-number and zero, which is expressible by the data format of the floating point processor and performs a logical operation among these values. The exponent operation unit 1305 responds to commands of a micro-ROM 1310 to carry out an operation processing for the exponent of the floating point data. The mantissa operation unit 1306 responds to commands of the micro-ROM 1310 to carry out an operation processing for the mantissa of the floating point data. The constant ROM is a ROM for storing constants necessary for arithmetic operations. The multiplier 1308 carries out multiplication for the mantissa of the floating point number.

Figure 25:
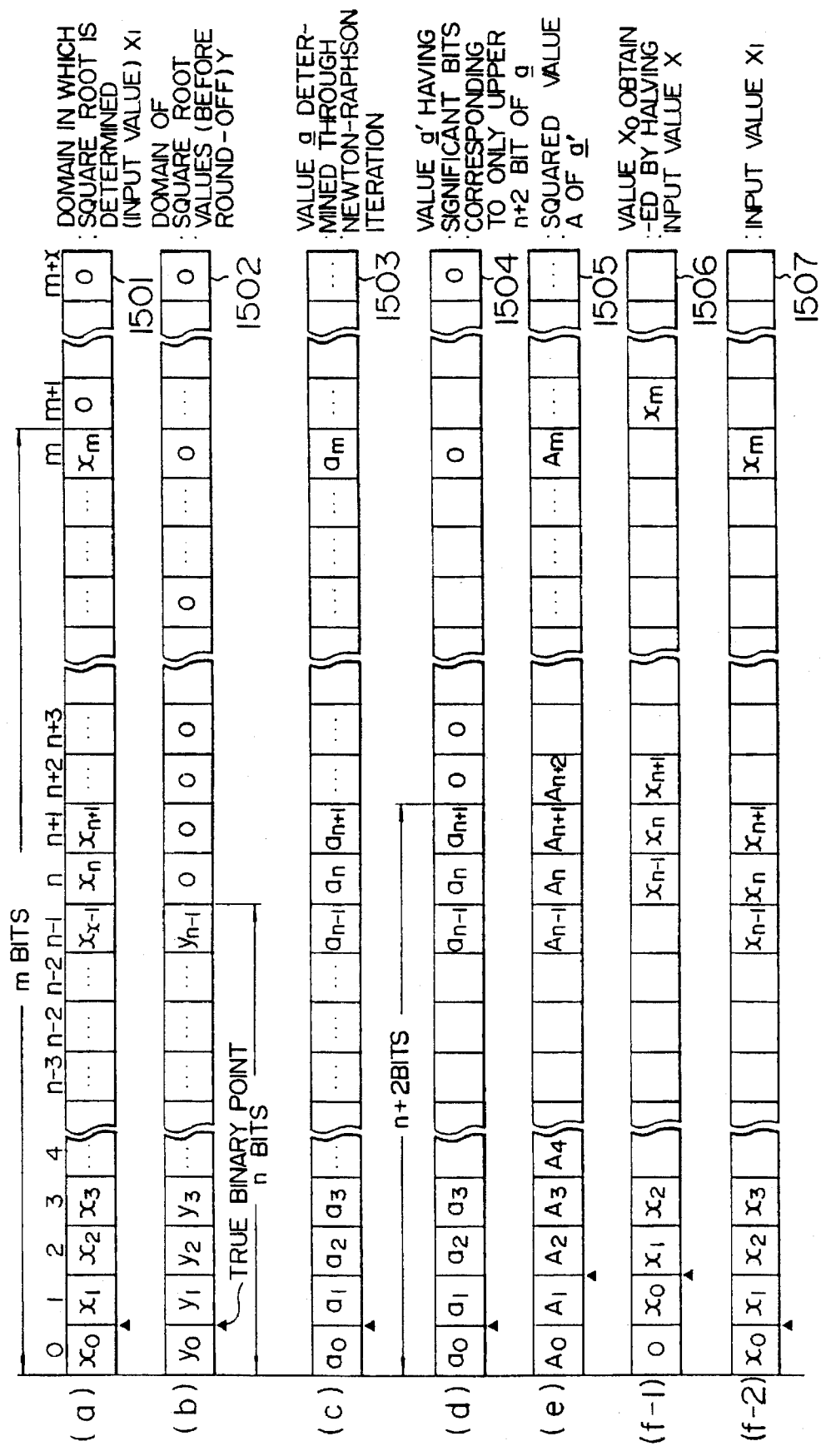
FIG. 25 is a diagram showing intermediate values when obtaining a square root.
Figure 26:
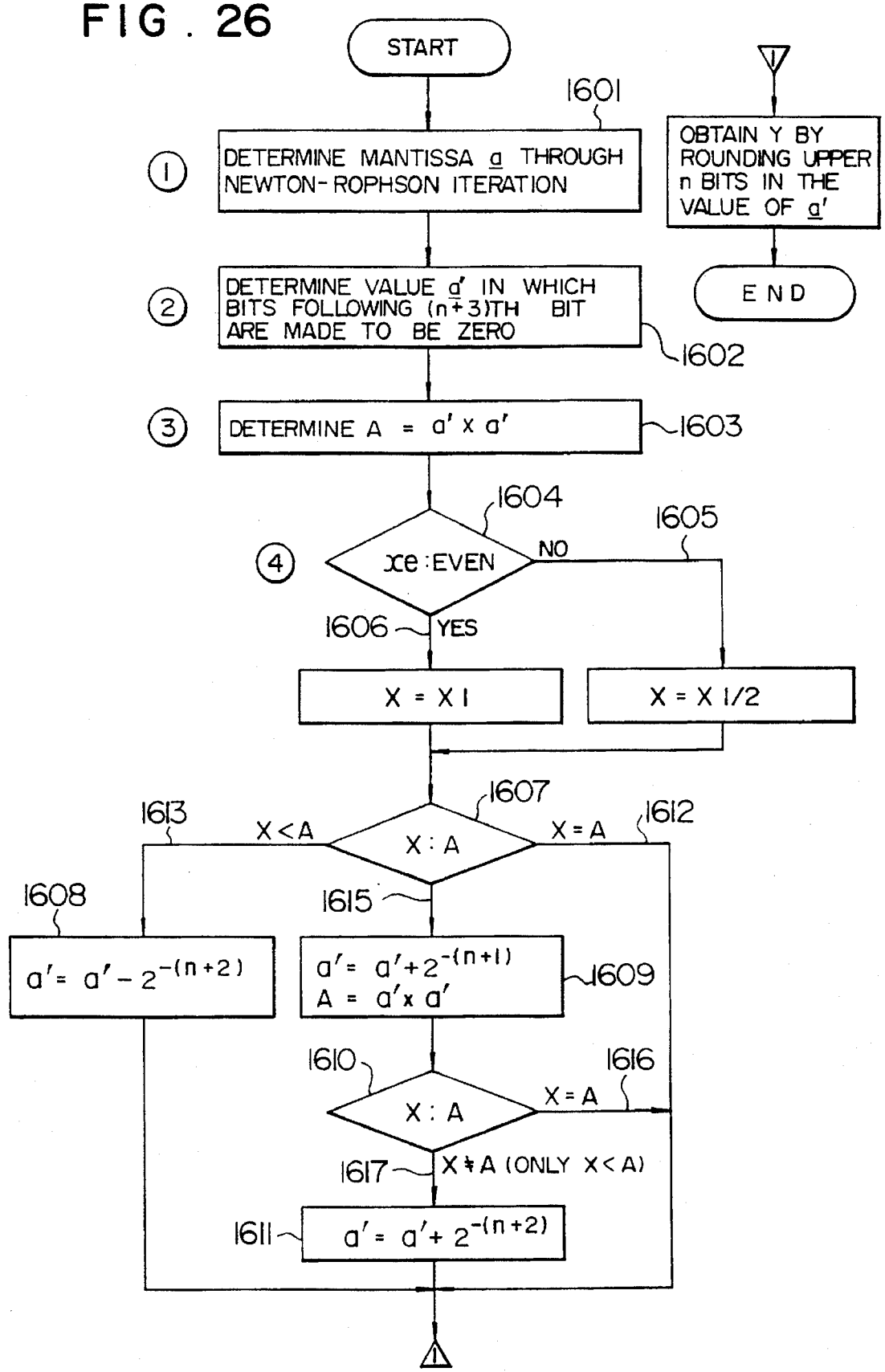
FIG. 26 is a diagram showing a detailed flowchart when the results of approximation have sufficient accuracies.
Figure 27:
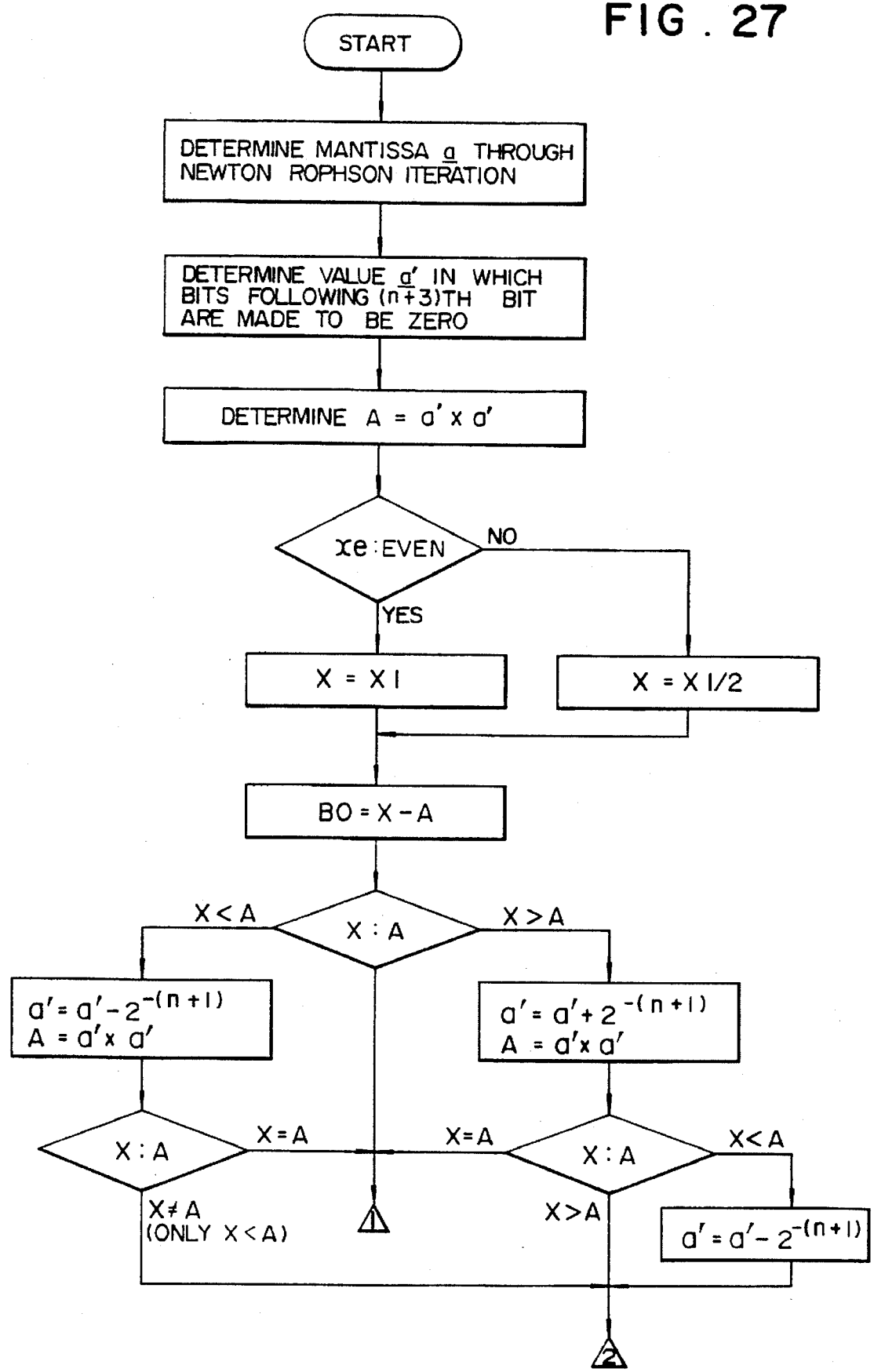
FIGS. 27 and 28 are diagrams showing a detailed flowchart when the results of approximation do not have sufficient accuracies.
Figure 28:
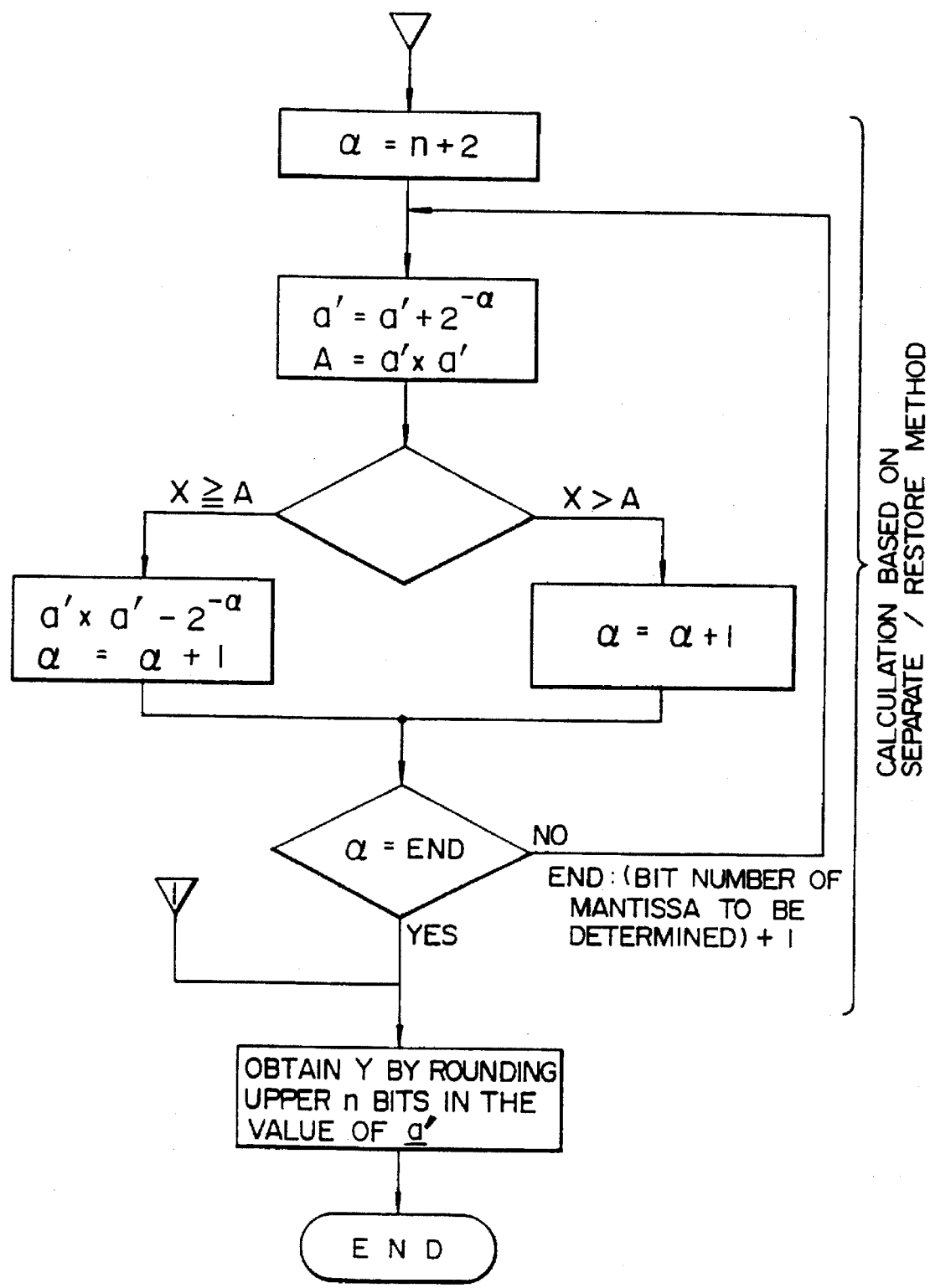

FIG. 25 shows a format of intermediate value (only the mantissa) used when the square root is to be obtained. FIG. 26 shows a method of calculating the square root when the accuracy of approximate solution is sufficiently higher than the resolution of strict solution and FIGS. 27 and 28 show a method of calculating the square root when the accuracy of approximate solution is lower than the resolution of strict solution. FIG. 26 indicates an instance where data which is shorter than the accuracy of Newton-Raphson is to be obtained and in the figure, n denotes the number of bits of the mantissa to be determined. FIGS. 27 and 28 indicate an instance where data longer than the accuracy of Newton-Raphson is to be determined and in the figures, a denotes β value or less values where $\pm 2^{-\beta}$ represents the accuracy of Newton-Raphson.

Presupposition is as follows:

$$Y = \sqrt{X},$$

$$X = (-1)^\phi \times 2^{x_e} \times \sum_{j=\phi}^{m} (2^j \times x_j)$$

where $x_e$ is the exponent of the argument and $x_j$ is the bit value of the j-th digit below the binary point in the mantissa of the argument, $$Y = (-1)^\phi \times 2^{y_e} \times \sum_{j=\phi}^{n} (2^j \times y_j)$$

where $y_e$ is the resulting exponent and $y_j$ is the bit value of the j-th digit below the binary point in the resulting mantissa, and $$x0 = y0 = 1$$

In case where the accuracy of approximate solution is sufficiently higher than the resolution of strict solution, the square root is determined in accordance with the following calculating method.

It is assumed now that the digit number of argument 1501 for square root extraction is m bits and the digit number of the domain of the square root values 1502 is n bits. The Newton-Raphson iteration is conducted on the basis of the argument to obtain the result 1503 of, for example, m bits (FIG. 25a). (m>n).

The above result is rounded into (n+2)-bit length and zero is filled into bits following the (n+3)th bit, thus obtaining an approximate solution a' 1504. The approximate solution a' is squared to obtain A1505. Digit matching (4) conformable to the internal processing based on the Newton-Raphson iteration is carried out to obtain 1506 or 1507 and thereafter a squared value A is compared with argument x.

When x=A, 1612, the value of a' is rounded into n-bit length to obtain Y.

When x>A, 1615, the value of a' and the resulting value is squared to obtain new A. Subsequently, the argument A is again compared with A. When x=A, 1616, the value of a' is rounded into n-bit length to obtain Y.

When x<A, 1617, the value of a' is set to a value which is adjacent to a' and smaller than a' and the resulting value is rounded into n-bit length.

In case where the accuracy of approximate solution is lower than the resolution of strict solution, the square root is determined in accordance with the following calculating method.

This is the same as the case of (3) with the exception that after completion of comparison, the dichotomy is recovered. For details, reference should be made to the flowchart (FIGS. 27 and 28).

We claim:

1. A hybrid type function calculating system for obtaining a strict solution y of n-bit length to a function f(x) where y equals a root of x, wherein the accuracy of approximate solutions is sufficient and the function f(x) has an inverse function $f^{-1}(y)$ comprising:

a first multiplier for multiplying a value x normalized from an approximate solution y'=g(x) having an error smaller than a value $E_o$ which is smaller than a resolution of said strict solution y from said inverse function $f^{-1}(y)$ in a domain of said approximate solution y' with an initial value Xo obtained from a parameter ROM by use of a normalized value x;

a second multiplier for multiplying said initial value $x_o$ with upper n-bits of data obtained through a feed-back path from an output of said first multiplier to obtain said approximate solution y'=g(x) of (n+2)-bit length;

an adder/subtractor for comparing an inverse function $f^{-1}(y')$ with said normalized value x;

first means for determining y" by correcting a bit string of said approximate solution y' in accordance with results from said adder/subtractor; and second means for determining y''' by correcting a bit string of y" in accordance with results of the comparison of $f^{-1}(y'')$ with x and obtaining said strict solution y by rounding y'''.

2. A hybrid type function calculating system wherein the algorithm as recited in claim 1 is applied to arithmetic algorithm for square root.

3. A hybrid type function calculating system for obtaining a strict solution y of n-bit length to a function f(x) where y equals a root of x, wherein the accuracy of approximate solutions is insufficient and the function f(x) has an inverse function $f^{-1}(y)$, comprising:

a first multiplier for multiplying a value x normalized from an approximate solution y'=g(x) having an error smaller than said strict solution y from said inverse function $f^{-1}(y)$ in a domain of said approximate solution y' with an initial value $x_o$ obtained from a parameter ROM by use of a normalized value x;

a second multiplier for multiplying said initial value $x_o$ with upper n-bits obtained through a feed-back path from an output of said first multiplier to obtain said approximate solution y'=g(x);

an adder/subtracter for comparing an inverse function f(y') with said value x;

first means for determining y" by correcting a bit string of y' up to an m-th bit in accordance with results from said adder/subtracter and determining a difference between $f^{-1}(y'')$ and x; and second means for obtaining said strict solution y by starting a dichotomy on the basis of the remainder (m-n) bit string.

4. A hybrid type function calculating system wherein the algorithm as recited in claim 3 is applied to arithmetic algorithm for square root.

5. A hybrid type function calculating system for obtaining a strict solution y of n-bit length to a function f(x) where y equals 1/x, wherein accuracy of approximate solutions is sufficient and the function f(x) has an inverse function $f^{-1}x(y)$ comprising:

a first multiplier for multiplying a value x normalized from an approximate solution y'=g(x) having an error smaller than a value $E_o$ which is smaller than a resolution of said strict solution y from said inverse function $f^{-1}(y)$ in a domain of said approximate solution y' with an initial value Xo obtained from a parameter ROM by use of a normalized value x;

a second multiplier for multiplying said initial value $X_o$ with upper n-bits obtained through a feed-back path from an output of said first multiplier to obtain an approximate solution y'=g(x) of (n+2)-bit length;

an adder/subtractor for comparing a normalization number 1.0 with an output from said second multiplier;

first means for determining y" by correcting a bit string of said approximate solution y' in accordance with results from said adder/subtractor; and second means for determining y''' by correcting a bit string of y" in accordance with results of the comparison in said adder/subtractor and obtaining said strict solution y by rounding y'''.

6. A hybrid type function calculating system for obtaining a strict solution y of n-bit length to a function f(x) where y equals 1/x wherein the accuracy of approximate solutions is insufficient and the function f(x) has an inverse function $f^{-1}(y)$, comprising:

a first multiplier for multiplying a value x normalized from an approximate solution y'=g(x) having an error smaller than a value $E_o$ which is smaller than a resolution of said strict solution y from said inverse function $f^{-1}(y)$ in a domain of said approximate solution y' with an initial value $x_o$ obtained from a parameter ROM by use of a normalized value x;

a second multiplier for multiplying said initial value $x_o$ with upper n-bits obtained through a feed-back path from an output of said first multiplier to obtain an approximate solution y'=g(X);

an adder/subtractor for comparing an inverse function $f^{-1}(y')$ with said value x;

first means for determining y" by correcting a bit string of y' up to an m-th bit in accordance with results from said adder/subtractor and determining a difference between $f^{-1}(y'')$ and x; and second means for obtaining said strict solution y by starting a dichotomy on the basis of the remainder (m-n) bit string.

* * * * *